United States Patent
Viner et al.

(10) Patent No.: US 11,825,900 B2
(45) Date of Patent: Nov. 28, 2023

(54) DEPLOYABLE SAFETY DEVICE APPARATUS

(71) Applicants: Joshua Viner, West Hollywood, CA (US); Jonathan Viner, West Hollywood, CA (US); Matthew Alfin, West Hollywood, CA (US); Amelia Helmick, West Hollywood, CA (US); Andrew Reuter, La Crosse, WI (US); Andrew Wilson, Calabasas, CA (US)

(72) Inventors: Joshua Viner, West Hollywood, CA (US); Jonathan Viner, West Hollywood, CA (US); Matthew Alfin, West Hollywood, CA (US); Amelia Helmick, West Hollywood, CA (US); Andrew Reuter, La Crosse, WI (US); Andrew Wilson, Calabasas, CA (US)

(73) Assignee: JJC Imports, LLC, West Hollywood, CA (US)

( * ) Notice: Subject to any disclaimer, the term of this patent is extended or adjusted under 35 U.S.C. 154(b) by 295 days.

(21) Appl. No.: 16/823,257

(22) Filed: Mar. 18, 2020

(65) Prior Publication Data
US 2020/0297059 A1 Sep. 24, 2020

Related U.S. Application Data

(60) Provisional application No. 62/820,005, filed on Mar. 18, 2019, provisional application No. 62/820,013, (Continued)

(51) Int. Cl.
*G08B 21/00* (2006.01)
*A42B 3/04* (2006.01)
(Continued)

(52) U.S. Cl.
CPC ............ *A42B 3/0466* (2013.01); *A42B 3/006* (2013.01); *A42B 3/10* (2013.01); *A42B 3/30* (2013.01);
(Continued)

(58) Field of Classification Search
CPC ......... A42B 3/0466; A42B 3/006; A42B 3/10; A42B 3/30; A42B 3/0413; B60W 30/04;
(Continued)

(56) References Cited

U.S. PATENT DOCUMENTS 5,025,504 A * 6/1991 Benston .................... A42C 5/02
2/181.8
5,978,969 A * 11/1999 Vinding Diers ......... A42B 3/10
2/DIG. 11
(Continued)

FOREIGN PATENT DOCUMENTS

CN 2372932 4/2000
CN 204587117 8/2015
(Continued)

OTHER PUBLICATIONS

"International Application Serial No. PCT/US2020/023448, International Search Report dated Jul. 28, 2020", 4 pgs.
(Continued)

*Primary Examiner* — Mark S Rushing
(74) *Attorney, Agent, or Firm* — BARNES & THORNBURG LLP

(57) ABSTRACT

A shared ride system comprising a SIPV further comprising at least an integrated safety device wherein the safety device is a coupled safety helmet.

1 Claim, 25 Drawing Sheets

Related U.S. Application Data filed on Mar. 18, 2019, provisional application No. 62/820,039, filed on Mar. 18, 2019, provisional application No. 62/875,187, filed on Jul. 17, 2019, provisional application No. 62/909,653, filed on Oct. 2, 2019.

(51) Int. Cl.

| | |
|---|---|
| *A42B 3/10* | (2006.01) |
| *B62J 11/24* | (2020.01) |
| *A42B 3/00* | (2006.01) |
| *B60W 30/04* | (2006.01) |
| *B60W 30/08* | (2012.01) |
| *G01C 21/34* | (2006.01) |
| *G06Q 30/0645* | (2023.01) |
| *B62J 45/20* | (2020.01) |
| *B62J 45/40* | (2020.01) |
| *A42B 3/30* | (2006.01) |
| *G06Q 50/30* | (2012.01) |
| *H04W 4/00* | (2018.01) |

(52) U.S. Cl.
CPC ............ *B60W 30/04* (2013.01); *B60W 30/08* (2013.01); *B62J 11/24* (2020.02); *B62J 45/20* (2020.02); *B62J 45/40* (2020.02); *G01C 21/3438* (2013.01); *G06Q 30/0645* (2013.01); *A42B 3/0413* (2013.01); *G06Q 50/30* (2013.01); *H04W 4/00* (2013.01)

(58) Field of Classification Search
CPC ...... B60W 30/08; B60W 10/18; B60W 10/04; B60W 30/143; B60W 50/14; B62J 11/24; B62J 45/20; B62J 45/40; B62J 43/16; B62J 43/28; B62J 27/00; B62J 45/41; G01C 21/3438; G06Q 30/0645; G06Q 50/30; H04W 4/00; B62L 3/00; B62K 2204/00; B62M 7/12
USPC ...................................................... 340/568.1
See application file for complete search history.

(56) References Cited

U.S. PATENT DOCUMENTS

| | | |
|---|---|---|
| 2004/0090338 A1 | 5/2004 | Nishino et al. |
| 2013/0030657 A1 | 1/2013 | Chatterjee et al. |
| 2015/0008236 A1 | 1/2015 | Mills et al. |
| 2015/0066267 A1 | 3/2015 | Chun |
| 2015/0193729 A1 | 7/2015 | Van Wiemeersch et al. |
| 2015/0255994 A1 | 9/2015 | Kesler et al. |
| 2015/0291253 A1 | 10/2015 | Schieffelin |
| 2016/0073722 A1* | 3/2016 | Eustace ................ A42B 3/0466 340/539.13 |
| 2017/0136875 A1* | 5/2017 | Logan ..................... H04W 4/80 |
| 2017/0364995 A1* | 12/2017 | Yan ......................... H02J 7/007 |
| 2018/0194421 A1 | 7/2018 | Hines et al. |
| 2018/0251190 A1 | 9/2018 | Hancock et al. |
| 2019/0000172 A1* | 1/2019 | Sahley .................... G07F 9/105 |
| 2019/0082764 A1* | 3/2019 | Chen .................. G07C 9/00309 |
| 2020/0298841 A1 | 9/2020 | Viner et al. |
| 2020/0298925 A1 | 9/2020 | Viner et al. |

FOREIGN PATENT DOCUMENTS

| | | |
|---|---|---|
| CN | 107767500 | 3/2018 |
| DE | 102011100781 | 12/2011 |
| WO | WO-2016157069 A1 * | 10/2016 |
| WO | 2019217187 | 11/2019 |
| WO | 2020191104 | 9/2020 |
| WO | 2020191106 | 9/2020 |
| WO | 2020191108 | 9/2020 |

OTHER PUBLICATIONS

"International Application Serial No. PCT/US2020/023448, Written Opinion dated Jul. 28, 2020", 10 pgs.
"International Application Serial No. PCT/US2020/023446, International Search Report dated Jul. 31, 2020", 4 pgs.
"International Application Serial No. PCT/US2020/023446, Written Opinion dated Jul. 31, 2020", 9 pgs.
"International Application Serial No. PCT/US2020/023444, International Search Report dated Jun. 18, 2020", 2 pgs.
"International Application Serial No. PCT/US2020/023444, Written Opinion dated Jun. 18, 2020", 5 pgs.
"International Application Serial No. PCT/US2020/023446, Invitation to Pay Additional Fees dated May 14, 2020", 2 pgs.
"International Application Serial No. PCT/US2020/023448, Invitation to Pay Additional Fees dated Jun. 2, 2020", 2 pgs.
U.S. Appl. No. 16/823,253, filed Mar. 18, 2020, Safety Integrated Shared Vehicle System and Methods.
U.S. Appl. No. 16/823,259, filed Mar. 18, 2020, Safety Integrated Personal Mobility Vehicle.

* cited by examiner

DEPLOYABLE SAFETY DEVICE APPARATUS

CLAIM OF PRIORITY

This patent application claims the benefit of priority of Viner, et. al, U.S. Provisional Patent Application Ser. No. 62/820,005 filed on Mar. 18, 2019, the benefit of priority of Viner, et. al, U.S. Provisional Patent Application Ser. No. 62/820,013 filed on Mar. 18, 2019, the benefit of priority of Viner, et. al, U.S. Provisional Patent Application Ser. No. 62/820,039 filed on Mar. 18, 2019, the benefit of priority of Viner, et. al, U.S. Provisional Patent Application Ser. No. 62/875,187 filed on Jul. 17, 2019, and the benefit of priority of Viner, et. al, U.S. Provisional Patent Application Ser. No. 62/909,653 filed on Oct. 2, 2019, all of which are hereby incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright ©2019-20 Wheels Inc. All Rights Reserved.

TECHNICAL FIELD

This document pertains generally, but not by way of limitation, to safety integrated shared vehicle systems.

BACKGROUND

The shared vehicle ecosystem has moved from a nascent set of startup companies to a vibrant industry with a number of companies in a large number of markets, each company specializing in short distance rentals of bicycles and powered scooters. The industry has also experienced growing pains in the areas of safety. There have been a number of highly publicized accidents, injuries and deaths of subscribers to these services. Several safety measures have been fielded including rental of safety devices (e.g. traditional bicycle helmets rented or various disposable helmet types). In each case, these measures have left much to be desired in the areas of helmet sanitation, item loss/theft and validation that the safety device is being used. In all cases, the safety device is not in communication with the shared vehicle, not integrated to the deployment or recovery of the safety device before and after the shared vehicle rental. The previous safety measures also rely heavily on a direct human involvement (helmet rental/recovery by a human) (sanitation and restocking by a human.

SUMMARY

The present inventors have recognized, among other things, that a problem to be solved can include minimizing the labor involved in deploying safety device s with a shared ride system. Another aspect that can be solved is to minimize the effort required to keep a safety device sanitized. Yet another problem that can be solved is to determine whether a safety device is being used in conjunction with the shared ride rental. (e.g. helmet is not being worn by the renter during the ride) and a final problem of retrieving the safety devices after the ride is over. And another aspect of the solution includes allowing the ride to be monitored and controlled from a local or global controller by measuring a plurality of data parameters gathered during a ride to ensure the safest ride possible.

The present subject matter can help provide a solution to this problem, such as by using integrally designed safety devices that a) are deployed with the shared vehicle rental, b) are communicatively coupled to the shared vehicle, c) the system as a whole, is in constant communication between the shared vehicle, the shared vehicle management system, and the user who is using the Safety Device during a ride, d) the retrieval of the safety device, and e) the verified sanitation of the safety device, and f) the reset of the safety device. By accomplishing these integrations, the present solution can ensure the deployment of a safety device (helmet) at the time of rental, the use of a helmet by a shared vehicle renter during the rental, the retrieval and sanitization of the helmet without the intervention of a servicing personnel allowing the immediate redeployment of the shared vehicle with the same Safety Device Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention.

The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

System Level Description:

The example used in this description is intended as a median example of the solution proposed, rather than an exhaustive example of every permutation of this proposed solution. It can be appreciated that the recombination of the various aspects of this solution may result in many permutations.

Figure 1:
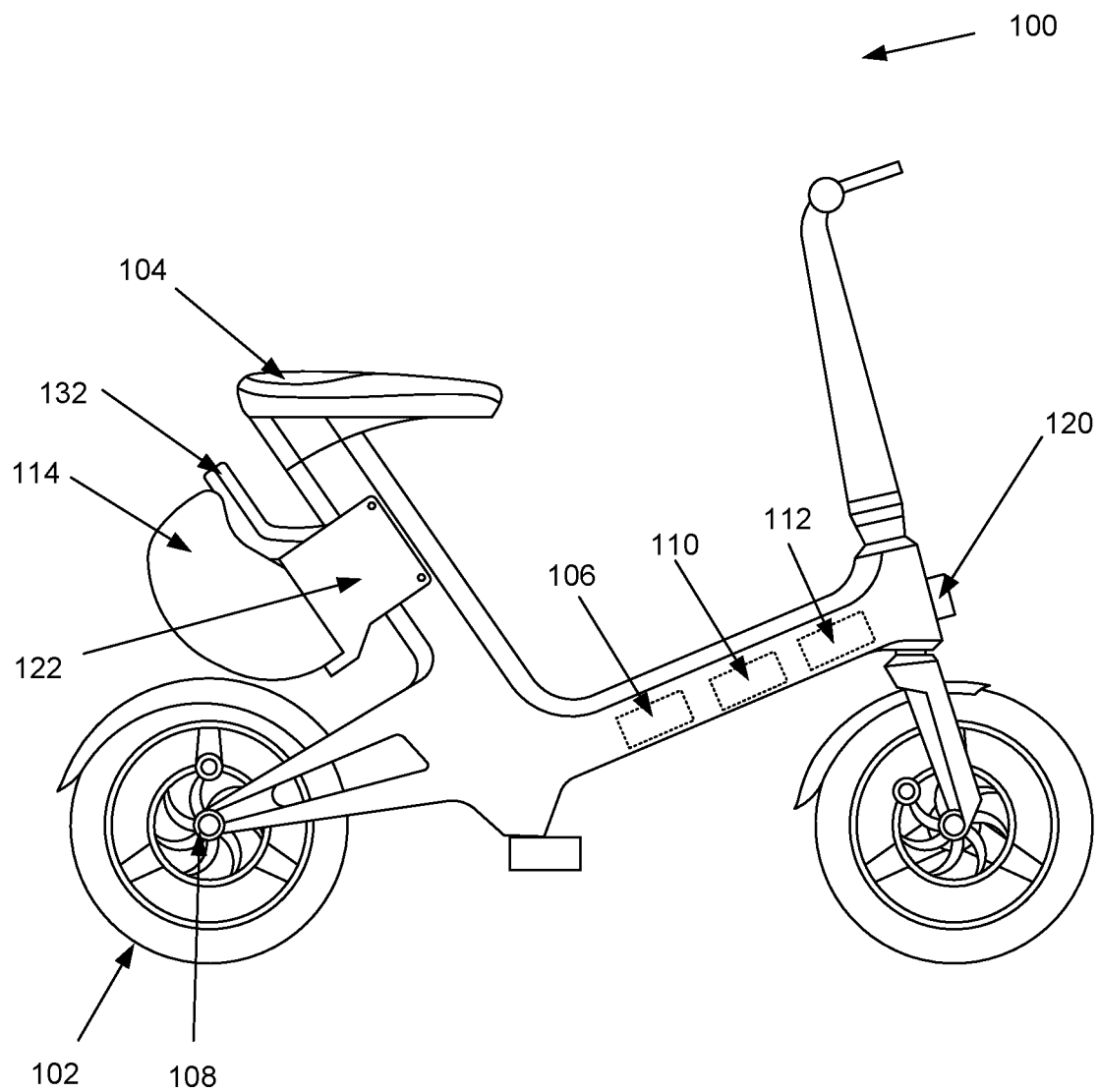
FIG. 1 is an example of a safety integrated electric vehicle disclosed herein.

The system example of this solution shown in FIG. 1 comprises at least a shared electrically powered vehicle (SIPV) 100 having at least two wheels 102, a seat 104 for the user of the SIPV 100, a drive apparatus 106 comprising at least a single motor 108, an authentication apparatus 110, a control apparatus 112 independently comprising functions and apparatus for steering, acceleration, braking of the SIPV 100, at least a single safety device 114 coupled with the SIPV 100 in storage, the safety device 114 (e.g. a helmet) removable from a safety device 114 coupling control apparatus upon a validated rental of the SIPV 100. For the sake of clarity, the SIPV 100 comprises electric bicycles, electric mopeds, electric scooters and can further comprise any/all electric mobility vehicles having up to three wheels that are powered by an electric motor and primarily get their energy from the power grid—in other words: an EV that can be recharged or powered externally. This includes purely electric vehicles, vehicles that assist human power with electrical power assistance (e.g. pedaled), vehicles with a combination of electric motor and a small combustion engine (range extended electric vehicles—REEV), and hybrid vehicles that can be recharge via the power grid (plug-in hybrid electric vehicles—PHEV.)

The solution further comprises a user validation system 128 that serves to validate a user and to release the safety device 114 via a coupling control apparatus 122, the coupling mechanism 132 holding the safety device 114 in storage, the safety device 114 affixed to a user of the SIPV 100 during the SIPV 100 trip or usage. The SIPV 100 is in communication with at least a network 116 and a sensor suite 118 affixed to the SIPV 100 and sensing the surrounding environment 134 or to the roadway 136. The SIPV 100 sensing comprises; several measurements related to the SIPV 100 location, the SIPV 100 condition, SIPV 100 battery levels, SIPV 100 tires pressure, rider/load weight, the ride progress, the use and 3D position of any safety devices 114 associated with the SIPV 100, the visual surroundings of the SIPV 100 with at least one camera 120 resident on the SIPV 100, the orientation and positions of the SIPV 100 as reported by accelerometers 124, load sensors 126 and the electric motor 108.

Figure 2:
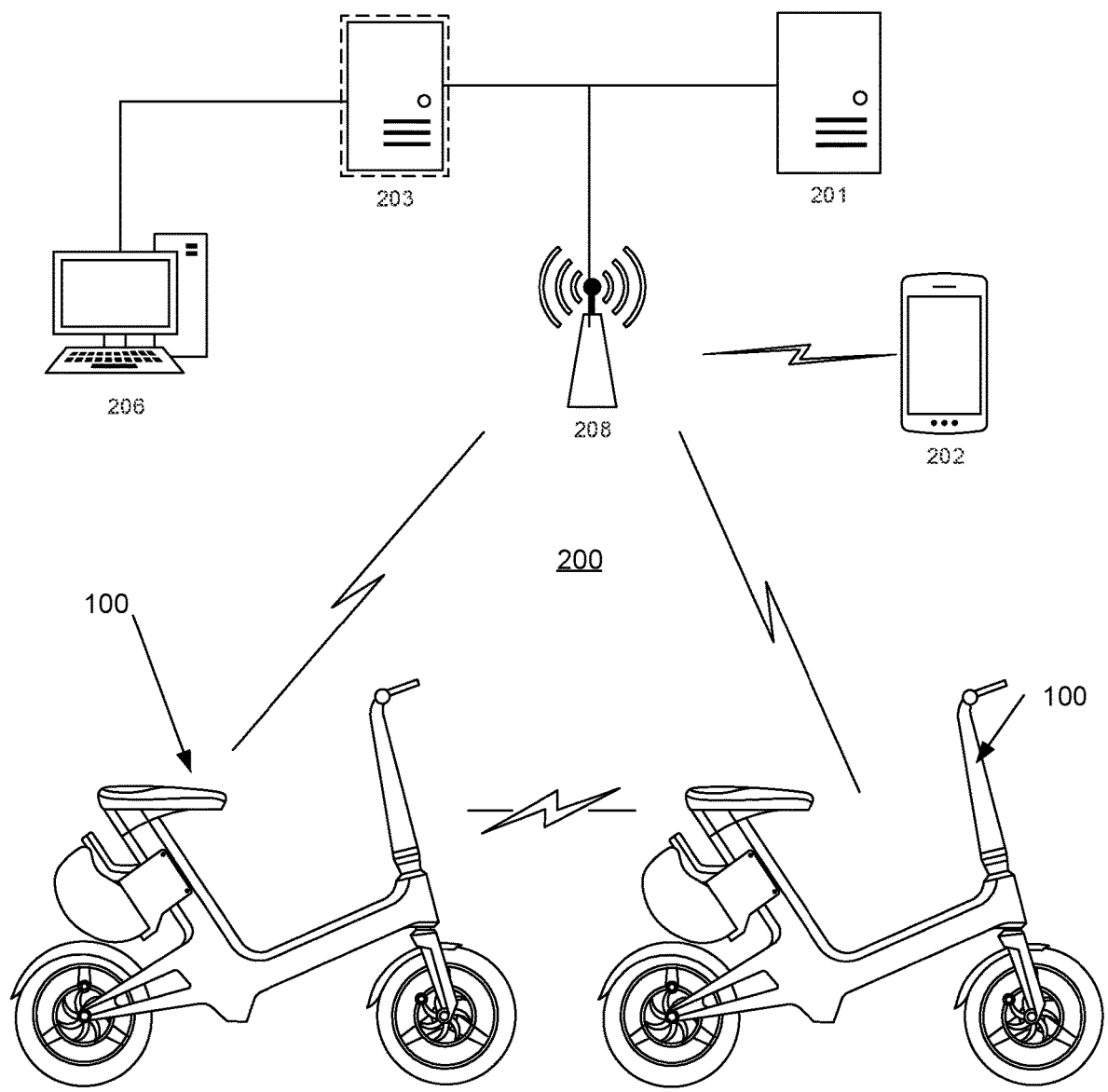
FIG. 2 is a block diagram depicting a shared vehicle rental transaction and the interaction of the systems disclosed here.
Figure 3:
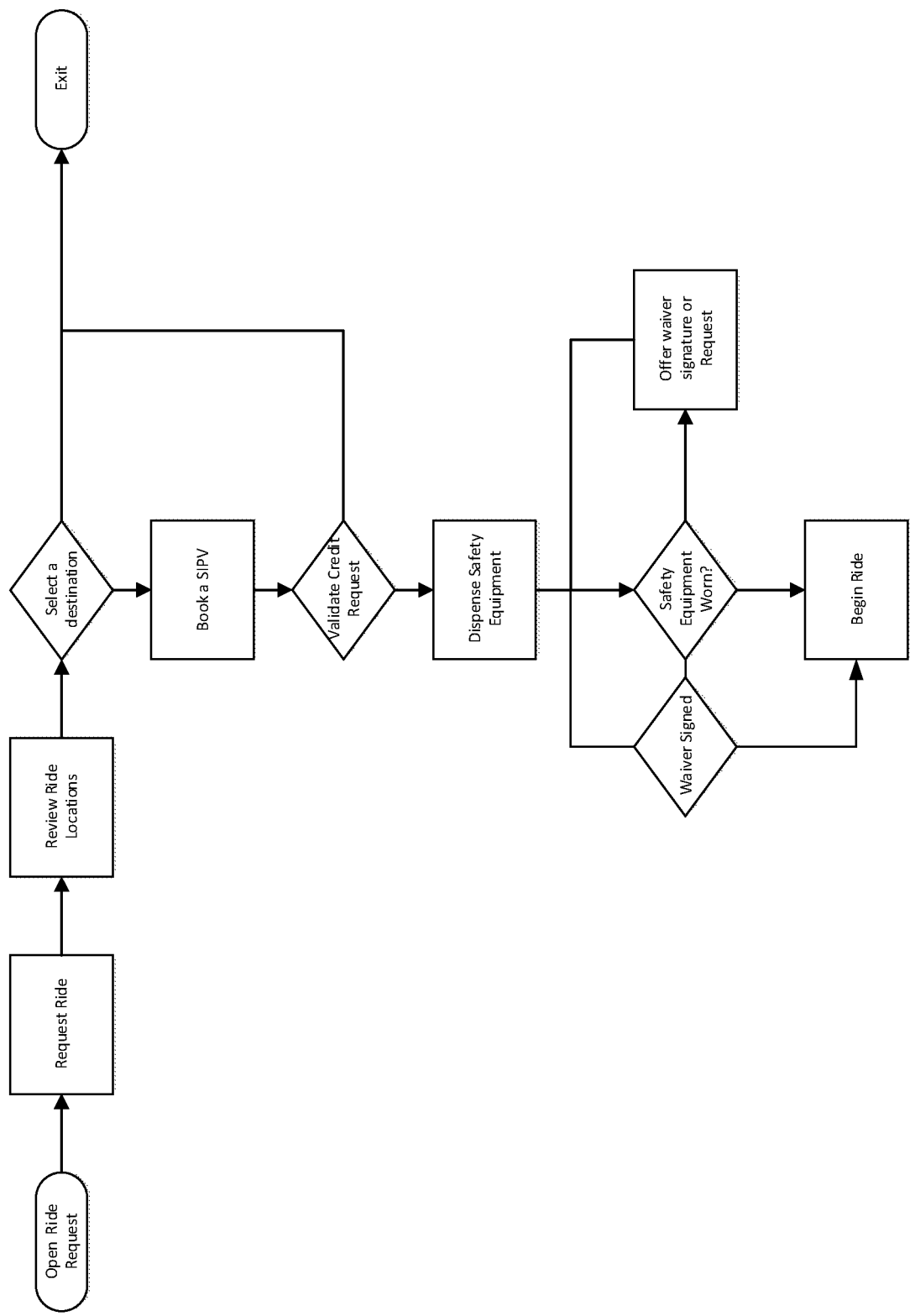
FIG. 3 is a block diagram depicting the interactions at the beginning of a shared vehicle rental trip and the interaction of the safety features disclosed herein.

System Typical Method of Operation:

As shown in FIG. 2, SIPV system 200 part of a network of SIPVs 100s interconnected via several network types 208 comprising cloud, cellular, wireless, mesh or CAN bus network either using Virtual Machines 203 or other processor hardware 201 to create a system grouping. The SIPVs 100 are placed either individually or in clusters in locations that are intended to serve a local population who needs to rent a SIPV 100 for a short/middle distance commute. A user, who wishes to use a SIPV 100, will typically locate and/or authenticate its rental of a SIPV 100 using a mobile device 202 or from a desktop machine 206. Once authenticated the user will receive the safety device 114 (e.g. a helmet) that is dispensed by the SIPV 100 and will don the safety device 114. In an alternative configuration as shown in FIG. 3, the user may decline to use the safety device 114 and the user would then be required to waive liability if allowed by local law.

Figure 4:
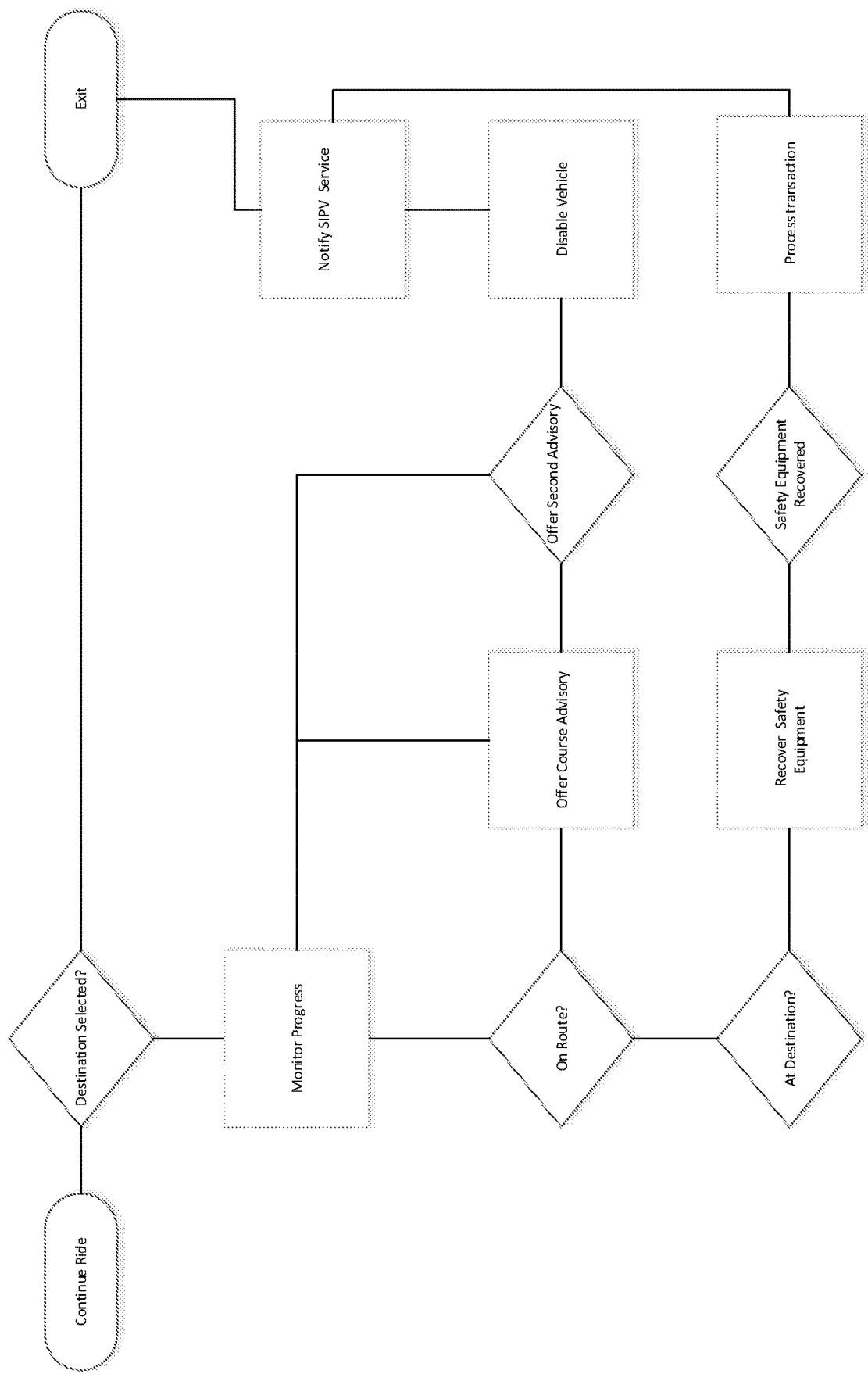
FIG. 4 is block diagram depicting the interaction of the safety features during a shared vehicle rental trip disclosed herein.

The safety device 114 will then authenticate that it is being used or not used, send an appropriate disclaimer to the user; if it is not being used, or has been left behind. In the case of non-equipped safety device 114 or cast-off safety device 114, the SIPV system 200 can be configured to disable the SIPV 100 until the safety device 114 is retrieved or utilized. The safety device 114, once properly equipped, connects to the vehicle as well as the SIPV system 200 network and the user's ride initiates. As shown in FIG. 3 and FIG. 4, during the trip, the SIPV system 200 and its network of machines (201, 203) identifies the ride progress, location and monitors several other ride parameters.

If the SIPV system 200 comprises, a destination management function, GPS monitoring that identify ride hazard/danger zones, (e.g., user leaving the destination route, rerouting or other ride deviation warnings). The SIPV system 200 can either activate SIPV 100 alarms, SIPV system 200 alarms or the user mobile device 202 alarms to alert that there is a deviation from the route plan. At this point other actions may be taken. The user finishes their ride with the SIPV 100, reattaches the safety device 114, removes the disposable liner on the safety device 114 to recondition the safety device 114 for the next user and disposes the disposable liner in the receptacle on the SIPV 100. The SIPV system 200 then confirms the user's ride completion and performs the ride completion actions comprising: parking the SIPV 100 in an approved location, reattaching the safety device 114s, and remediating the liners for the safety device 114 for the next user, disposing the used liner in the SIPV 100 receptacle, and then finalizes the transaction. The SIPV 100 then transmits its availability and status to the SIPV system 200. This would then initiate a status report of "Ready for the Next User", "Requires Servicing" (i.e. Power Depleted, Bad Location, Component Failure, or some other item) or in the case of nonresponsive SIPV 100; nearby SIPV 100 to SIPV 100 communication can be used to identify last known position of the failed SIPV 100 and provide other services like Bluetooth pinging to determine if a failed SIPV 100 is in Bluetooth range of another SIPV 100.

Figure 5:
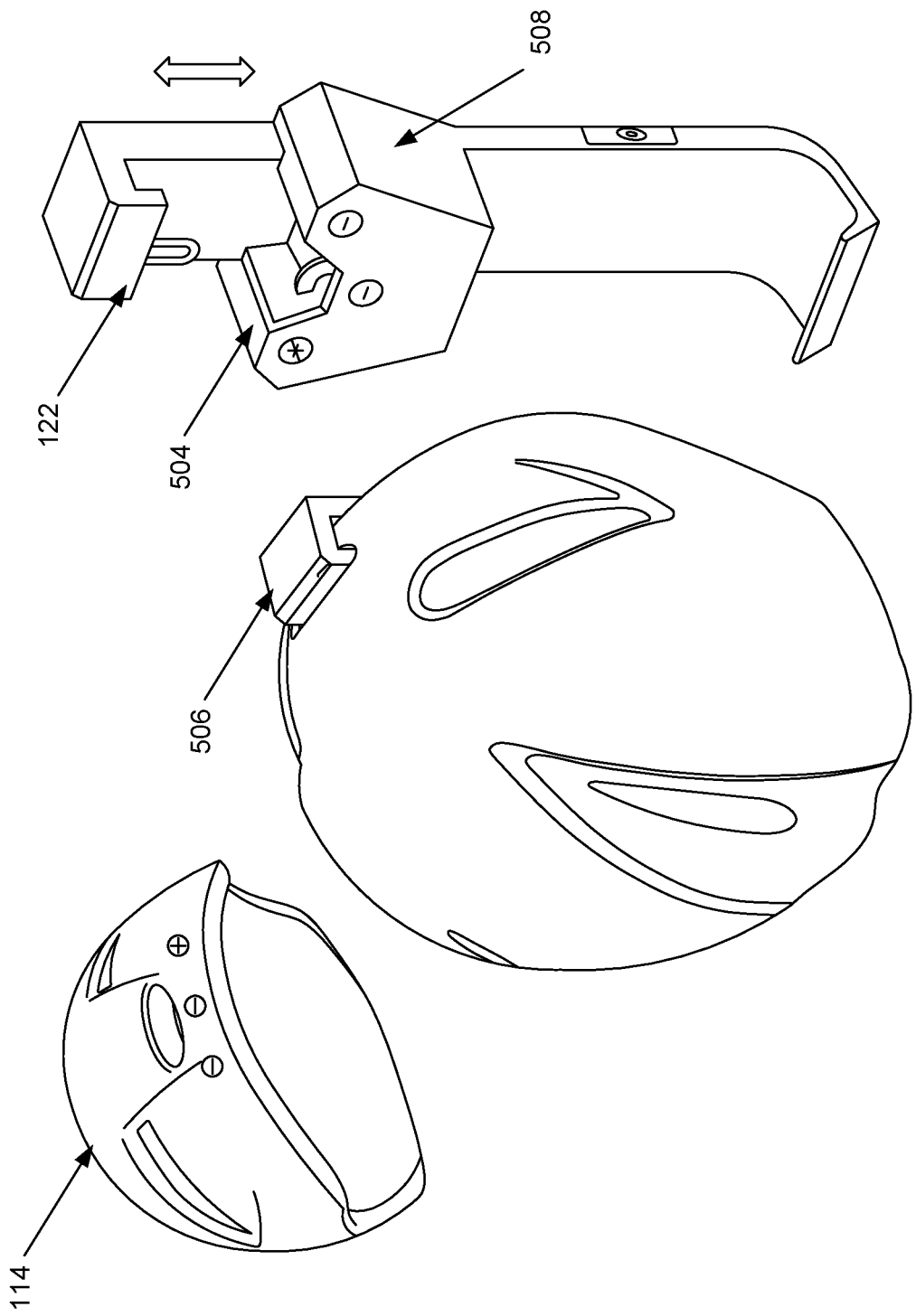
FIG. 5 is an example of an integrated safety device and its mounting apparatus disclosed herein.

Safety Device Dispenser:

As shown in FIG. 5-21 generally, the Safety device dispenser 122 has several variations that enables the SIPV system 200 to protect and validate that the user of the SIPV 100 is complying with local safety ordinances. In FIG. 5, the Safety Device Dispenser (SDD) 122 comprises the following modules, a) the Safety Device Retention Lock 504 further comprising a locking hinge 506 released by electronic command, articulatable to allow removal of the Safety device 114, b) the Dispenser Control Module 508 further comprising a network connection linkage, a monitoring linkage with the Safety device 114, a receiving/transmitting linkage to interconnect with the SIPV 100 and SIPV system 200 to receive and transmit data between the SDD 122, the Safety Device 114 (e.g., a helmet or other connected safety apparatus). The Safety Device 114.

An example of this solution would be where the Safety device 114 is a helmet with a disposable liner. The Safety device 114 would be attachable to the SIPV 100 using an SDD 122 equipped Safety device hook that releasable engages with the SDD 122 when triggered by a user transaction. A user rents a SIPV 100, the SIPV system 200 authenticates the user and transmits a release command to the SDD 122, the SDD 122 releases the Safety device hook, the user removes the Safety device 114, reengages the Safety device hook again, dons the Safety device 114 and is ready to ride. The SDD 122 acknowledges the unlocking of the Safety device hook, the relocking of the Safety device hook prior to the ride, the acknowledgement that the Safety device 114 is in place on the head of the user, monitors the continued use of the Safety device 114, monitors that the Safety device 114 is kept in near proximity to the vehicle during the rental.

Figure 6:
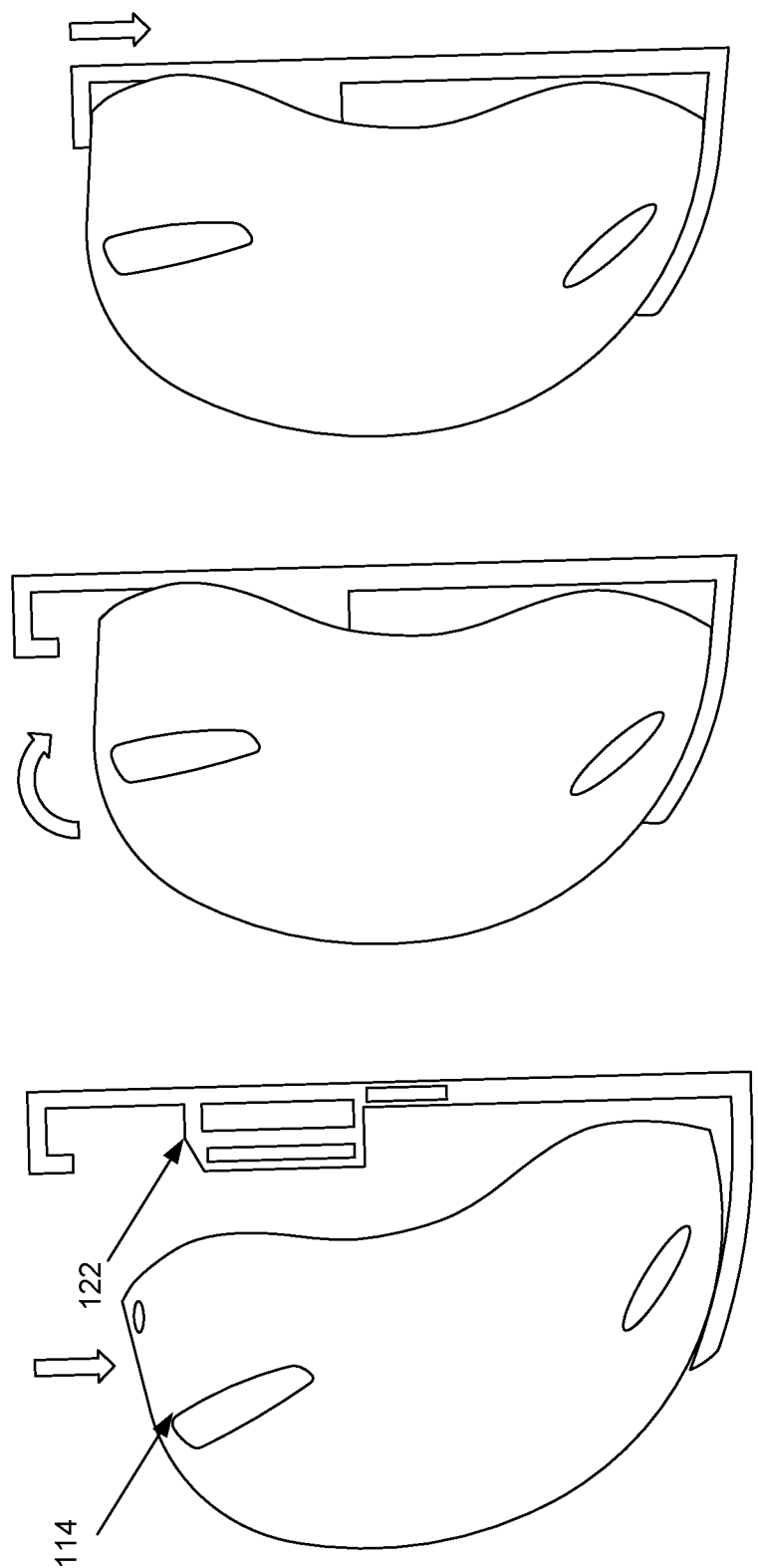
FIG. 6 is an illustration of the method steps of mounting the integrated safety device disclosed herein.

As shown in FIG. 6, at the end of the ride, the SDD 122 unlocks the Safety device hook, monitors whether the Safety device 114 has been replaced on the Safety device hook, monitors whether the helmet disposable liner has been removed, and placed in the SIPV 100 waste receptacle. The user places the front of the safety device 114 down into the curved bottom brace. The magnets excite the hall sensors with magnetic fields allowing the locking mechanism to become active. The user or the SDD 122 pushes down a latch which is then locked in place with a solenoid (e.g., a latching solenoid). The hall sensors enable a status notification that the helmet is returned. During and at the end of the rental the SDD 122 alerts the SIPV 100 and SIPV system 200 if any parameters are out of specification (i.e. missing helmet, misused helmet, unremoved used disposal liner) to allow the SIPV system 200 to react and respond to bring parameters back into specification. The SDD 122 continues to update the alerts if any parameter changes. At the end of the transaction, the SDD 122 affirms all elements are back in place and are ready for the next transaction. If any parameters remain out of specification the SDD 122 will generate a service alert which would keep the SIPV 100 out of service until it receives the service alert.

Figure 7:
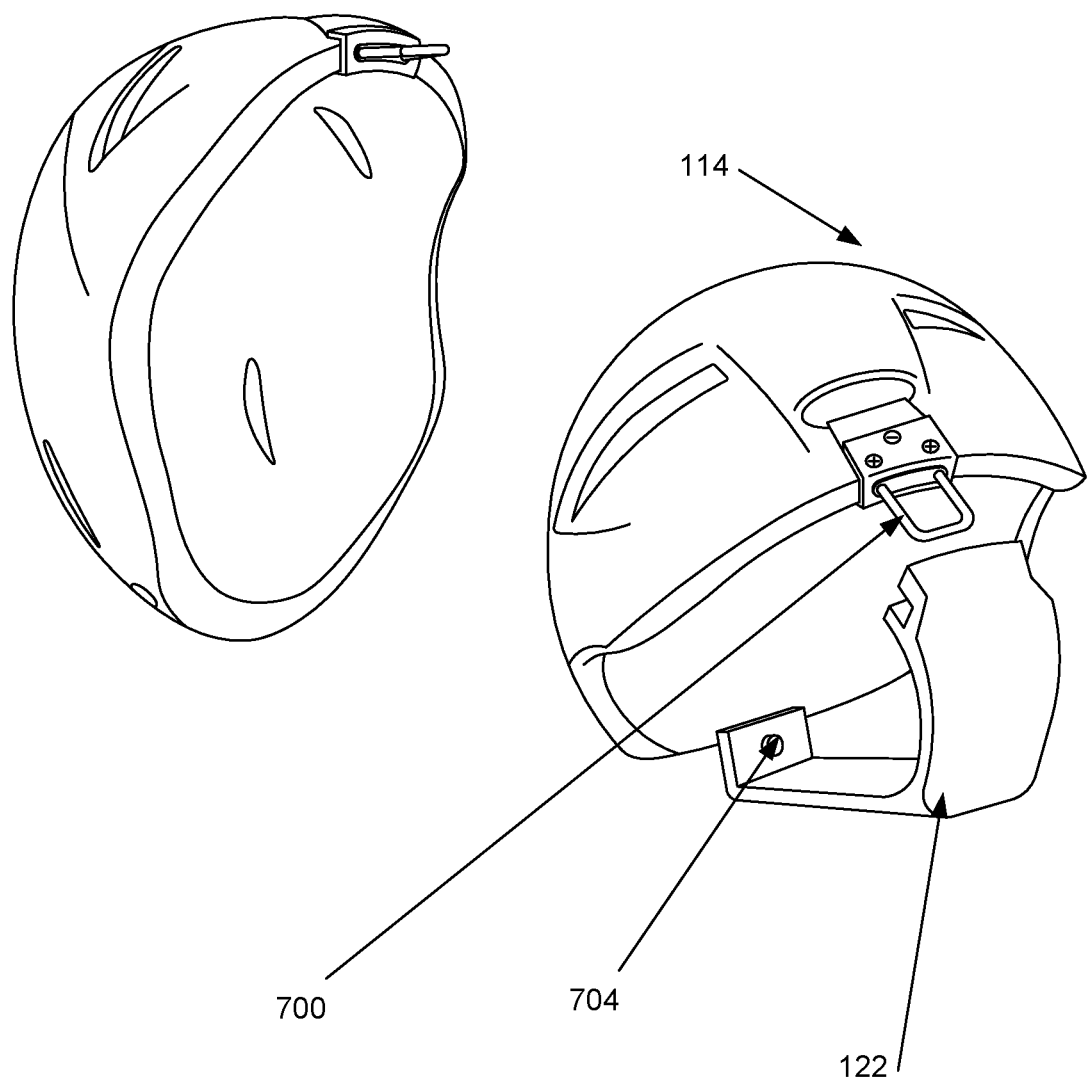
FIG. 7 is an example of another aspect of an integrated safety device and its mounting apparatus disclosed herein.

On the helmet mount variation shown in FIG. 7, The Safety Device 114 contains a helmet loop 700 with three magnets molded into the helmet loop 700 mounted on the back of the Safety device 114 and a small indent on the front of the Safety Device 114.

Figure 8:
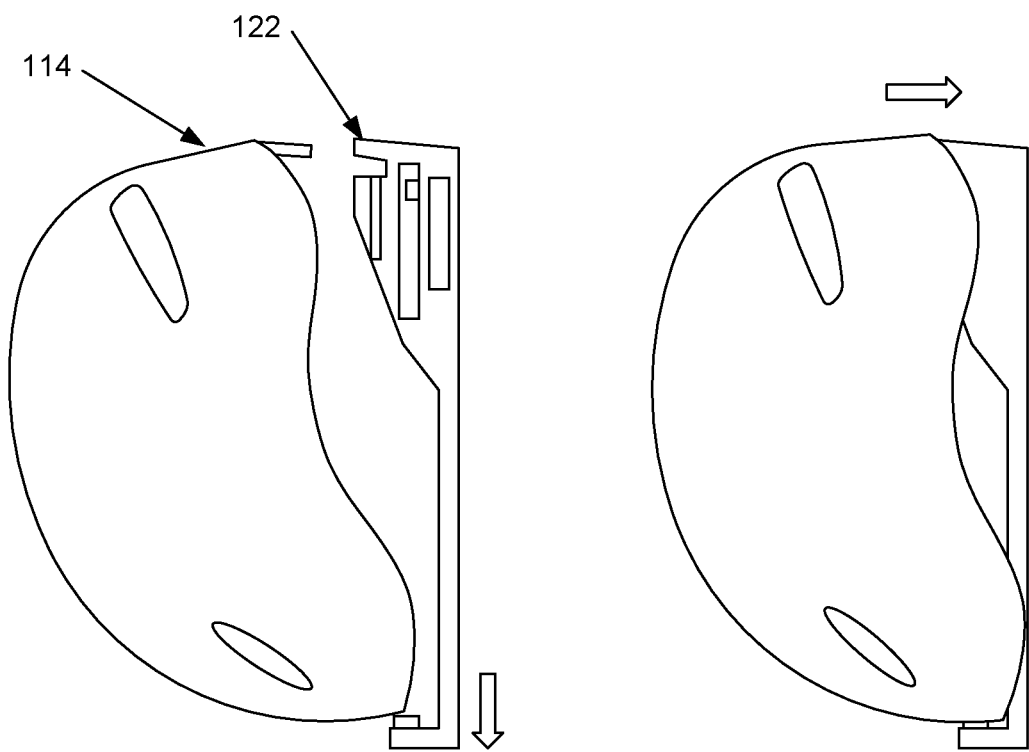
FIG. 8 is an illustration of the method steps of mounting of another aspect of an integrated safety device disclosed herein.

The Safety Device 114 is re mounted as shown in FIG. 8 by putting the mounting point into a catch point 704 at the base of the SDD 122 and engaging a locking member that traps the helmet loop thereby securing the helmet. The SDD 122 senses the correct location and presence of the Safety Device 114 and communicates to the SIPV system 200 of the Safety Device 114 status.

Figure 9:
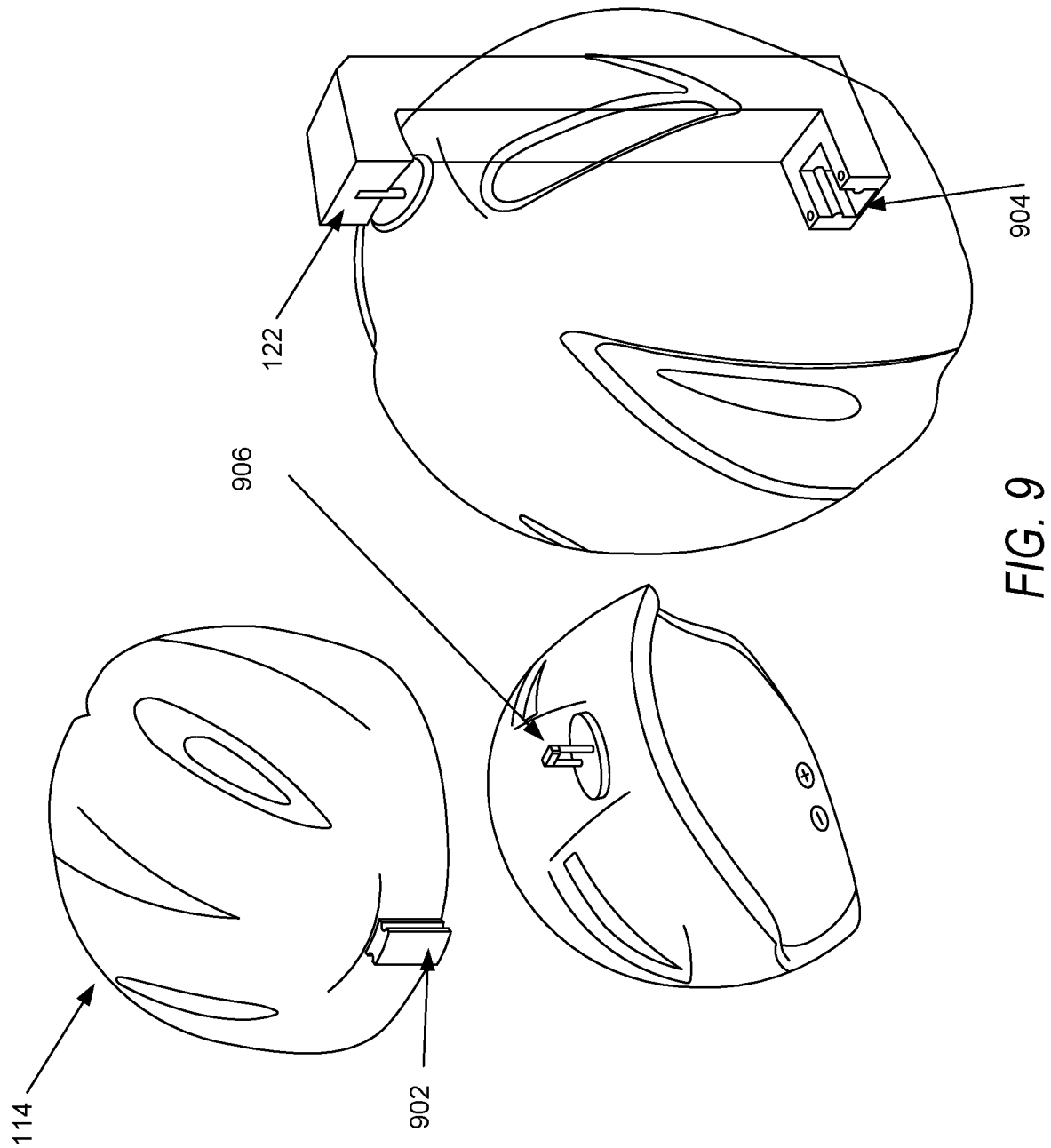
FIG. 9 is an example of another aspect of an integrated safety device and its mounting apparatus disclosed herein.

The mount variation of SDD 122 shown in FIG. 9, incorporates a slot 902 and key 904 mounted at the front of the Safety Device 114 with a helmet loop 906 mounted at the back. That contains an RFID sensor to sense the position of the helmet loop 906 The front of the helmet incorporates magnets to generate magnetic field for the hall sensors in the base of the SSD 122.

Figure 10:
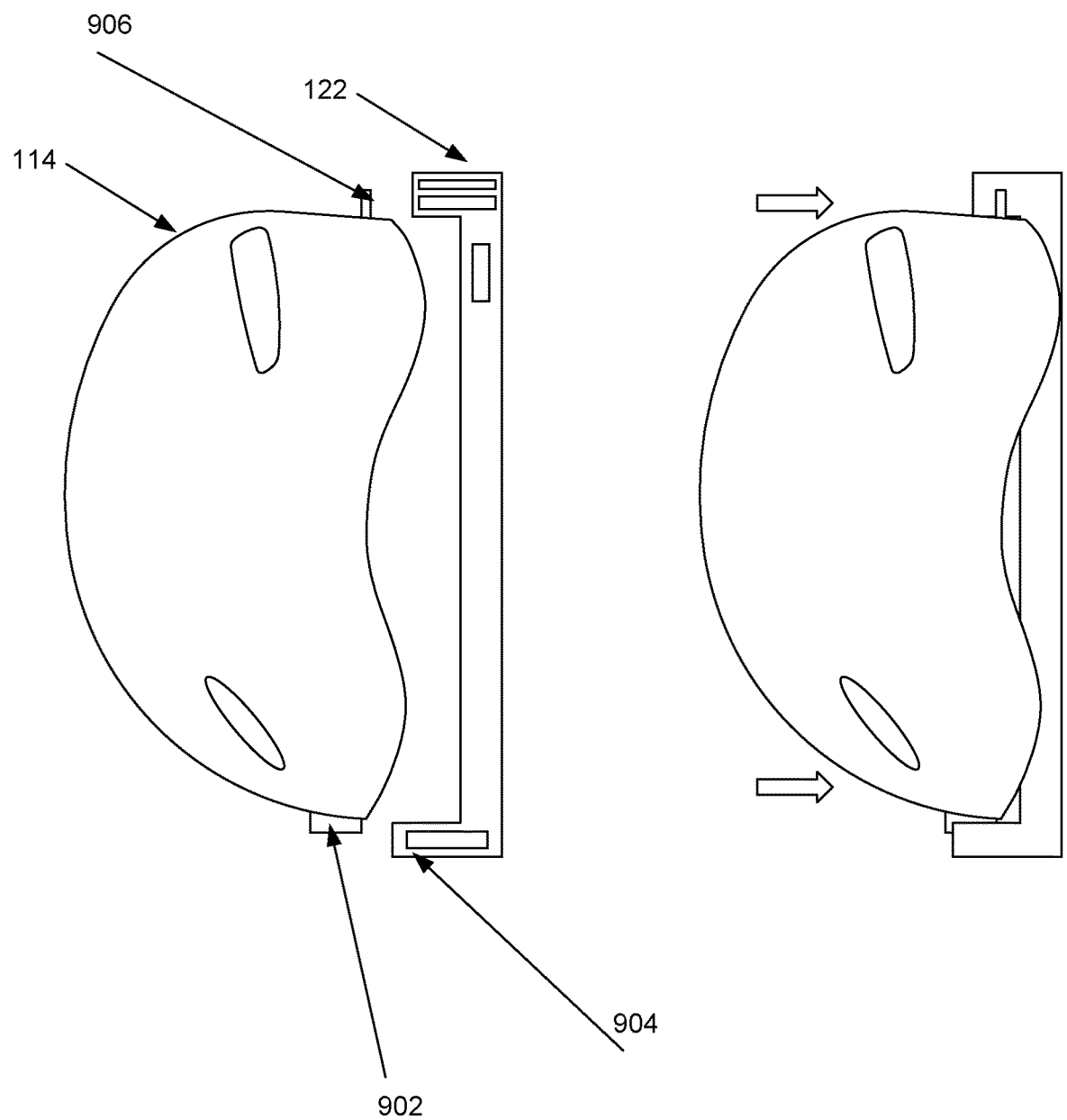
FIG. 10 is an illustration of the method steps of mounting of another aspect of an integrated safety device disclosed herein.

The mounting process as shown in FIG. 10 would be to align the key 904 with the slot 902, engaging the slot 902 with the insert 904 and aligning the helmet loop 906 to allow the SSD 122 to trigger a locking solenoid.

Figure 11:
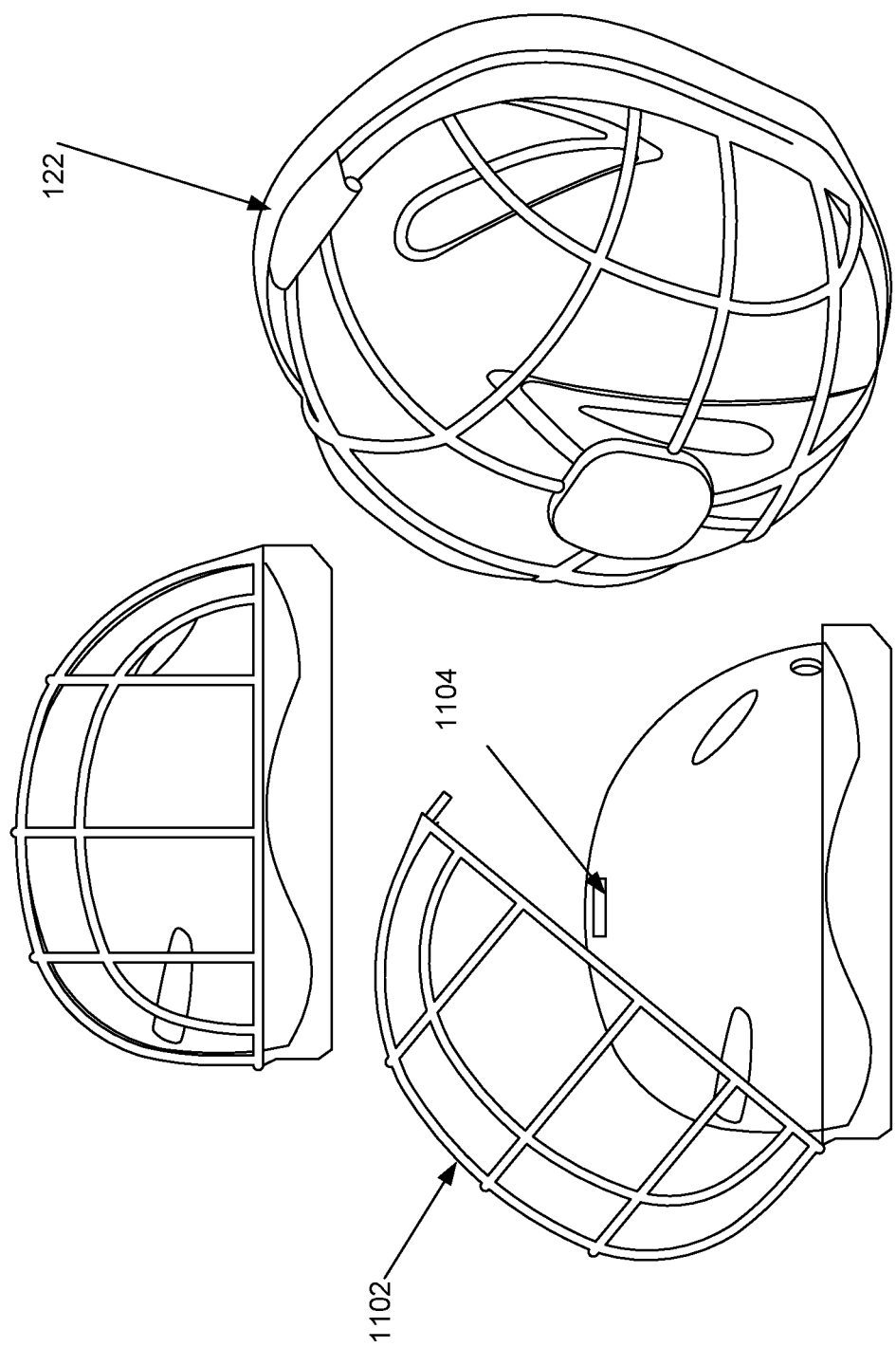
FIG. 11 is an example of another aspect of an integrated safety device and its mounting apparatus disclosed herein.
Figure 12:
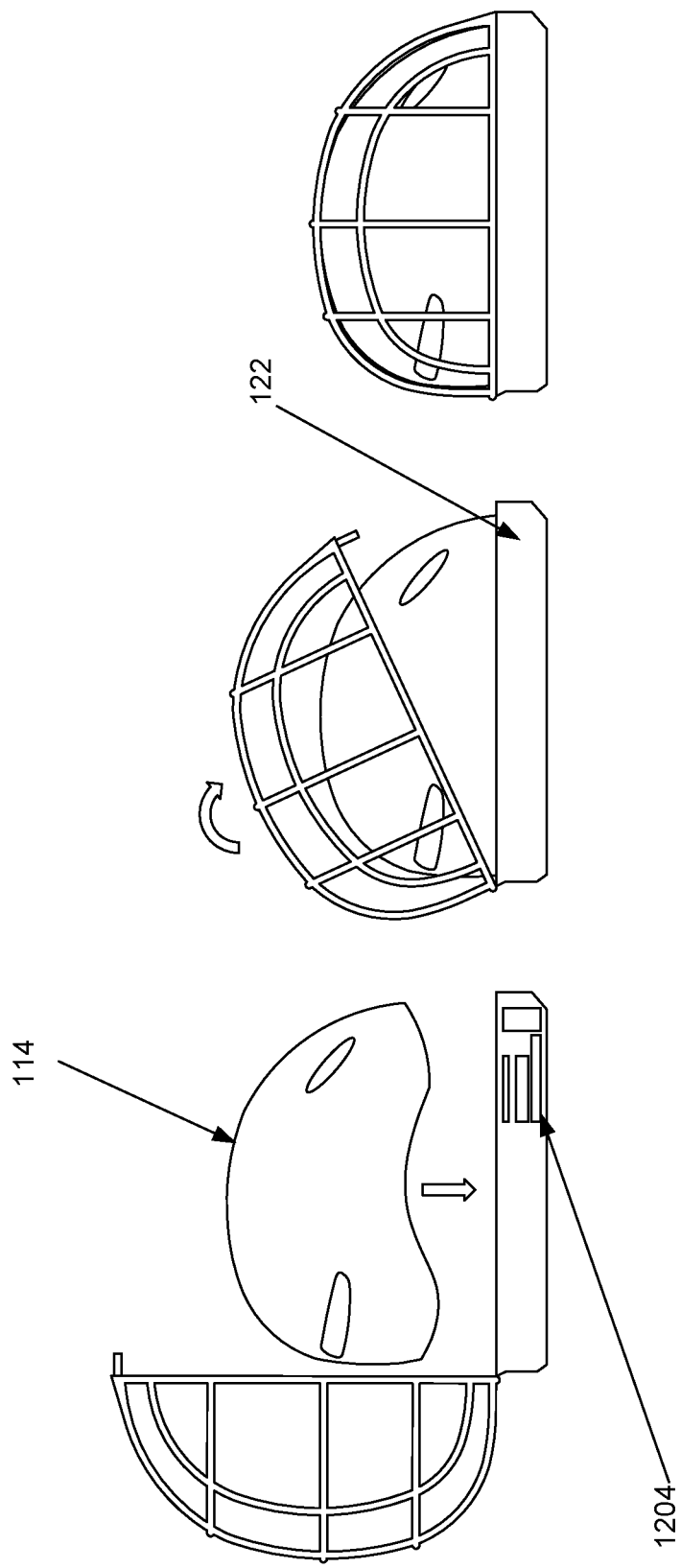
FIG. 12 is an illustration of the method steps of mounting of another aspect of an integrated safety device disclosed herein.

The variation shown in FIG. 11, a helmet cage version of the SDD 122. This enclosure 1102 comprises a framework of wires that enclose a Safety Device 114. In this variation the enclosure 1102 senses a RFID tag 1104 in the Safety Devices 114 via an RFID Sensor 1106 at the top of the enclosure 1102. A second RFID tag and sensor are used to detect full closure of the enclosure 1102 with the Safety device 114 enclosed. The benefits of this variation allow a Safety Device 114 to be fully secured. As shown in FIG. 12, the method of enclosing the Safety Device 114 is to simply place the Safety Device 114 into the enclosure 1102 and the enclosure closed and locked with a control module 1204.

Figure 13:
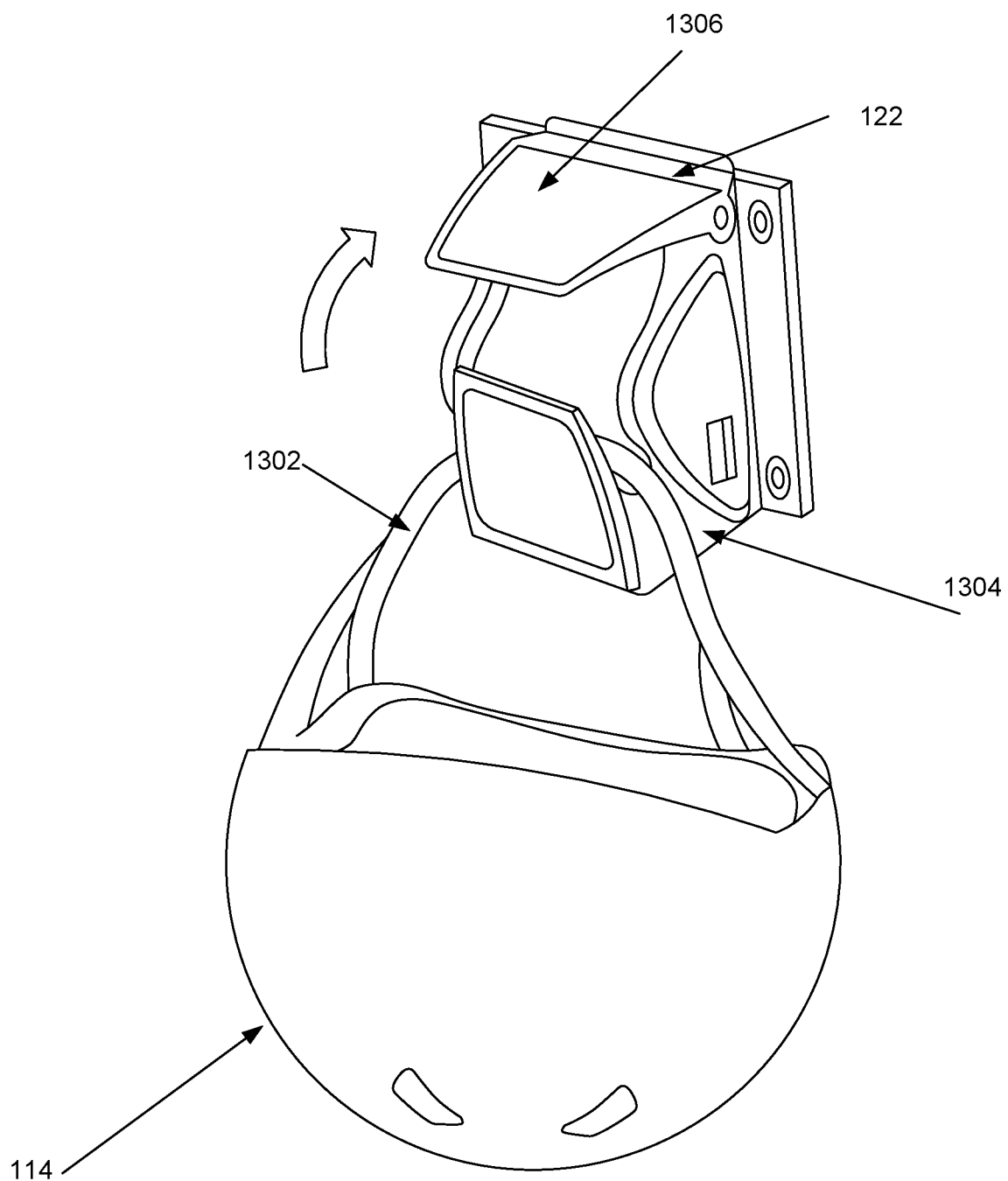
FIG. 13 is an example of another aspect of an integrated safety device and its mounting apparatus disclosed herein.
Figure 14:
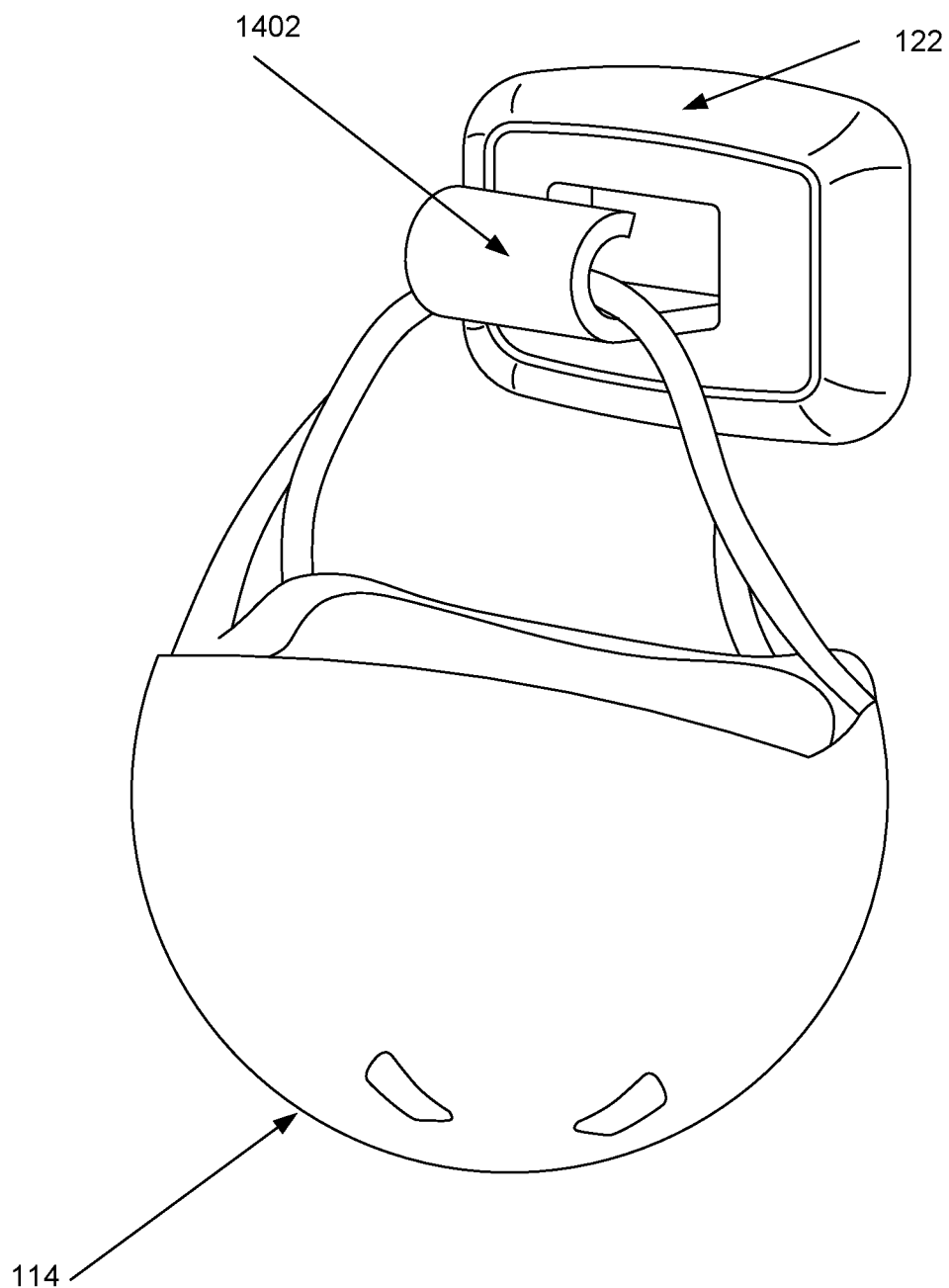
FIG. 14 is an example of another aspect of an integrated safety device and its mounting apparatus disclosed herein.
Figure 15:
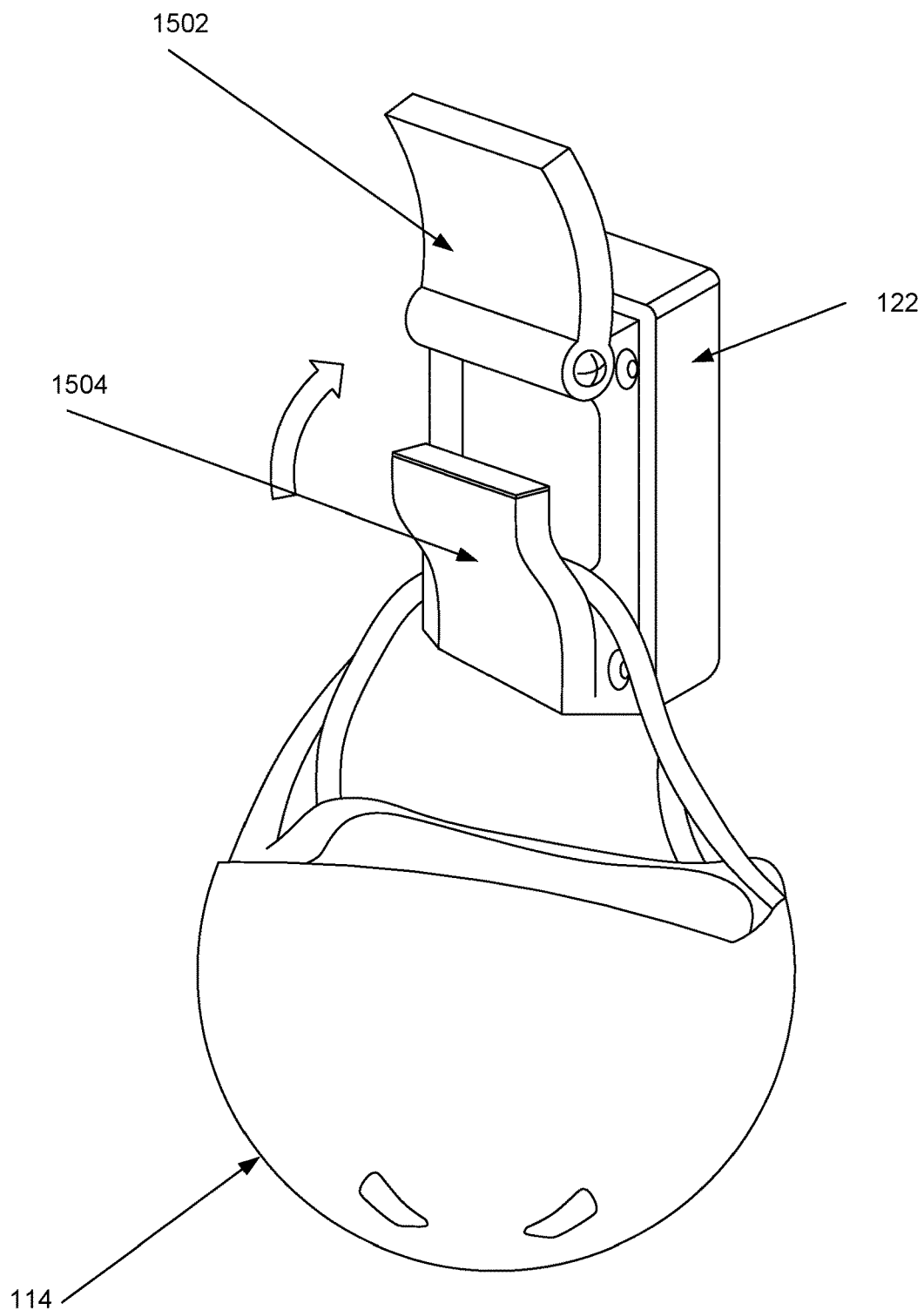
FIG. 15 is an example of another aspect of an integrated safety device and its mounting apparatus disclosed herein.

The variation shown in FIGS. 13, 14 and 15 show a Safety Device 114 secured by its strap 1302. The strap generally is made from a durable material that is difficult to cut or sever.

These variations comprise mounting the SDD 122 in places where a Safety Device 114 may be placed and hung by a strap 1302 and not interfere with a ride should a rider decline to utilize the Safety Device 114. The strap 1302 in FIG. 13 is attached to the SSD 122 via a fixed hook 1304 with a top closing clasp 1306. This variation of SSD 122 features a wireless or Bluetooth connection to the SIPV system 200 and the Safety Device 114 to help determine Safety Device 114 status and proximity using Near Field communication.

FIG. 14 utilizes a similar action but uses the SSD 122 to deploy and retract a hook 1402. As in the variation in FIG. 13, the SSD 122 uses wireless methodologies like Bluetooth, NFC, or RFID to communicate Safety Device 114 status. FIG. 15 is a variation of SSD 122 with a fixed bottom hook 1502 and an articulated closing top hook 1504 mounted on the steering column or handlebars of the SIPV 100 and is hardwired to the SIPV 100 power supply. The Safety Devices 114 is not in wireless communication and utilizes a magnet in the helmet buckle to trigger and unlatch the top hook 1504 when the SIPV system 200 authorizes the release.

Figure 16:
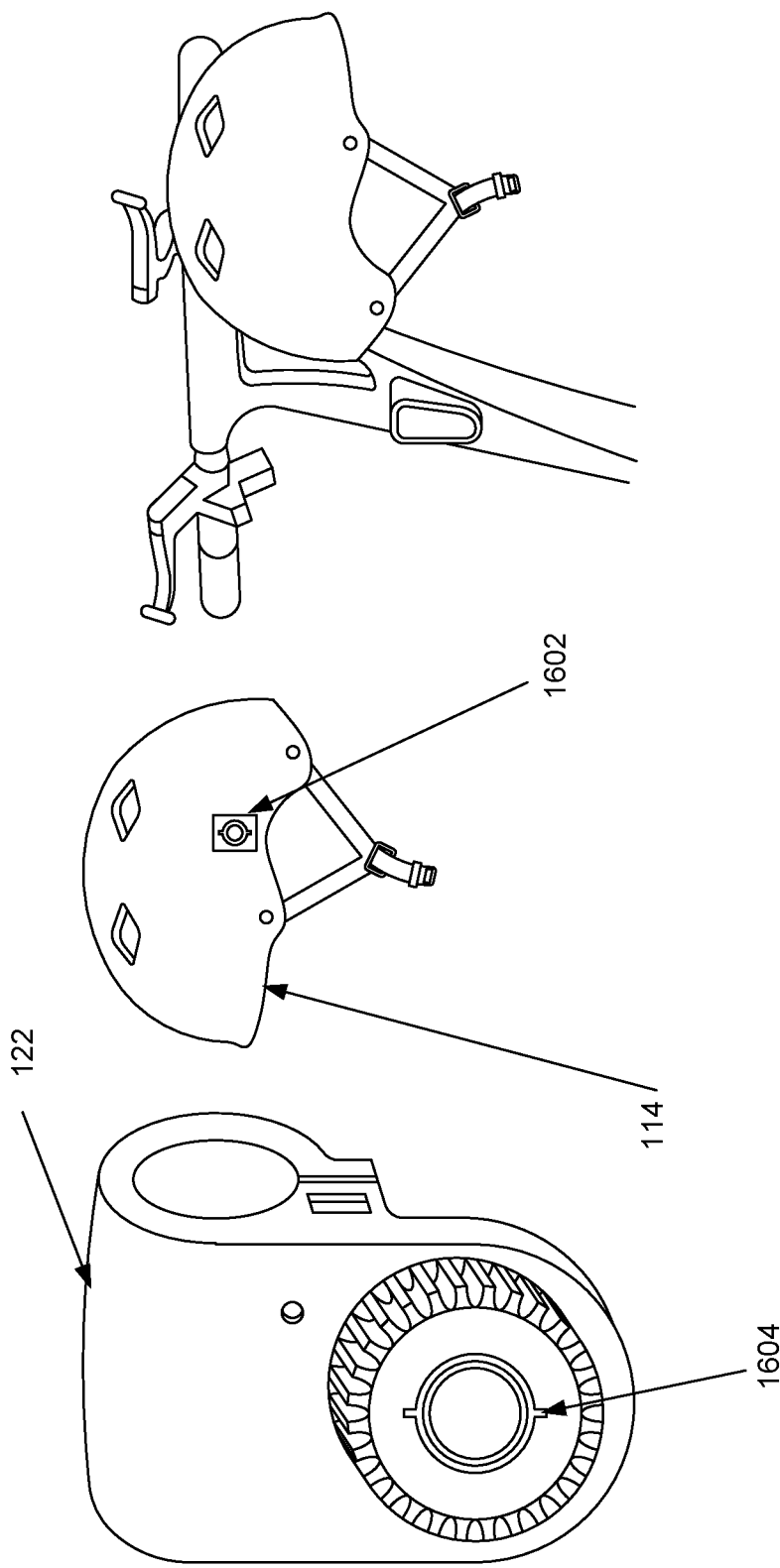
FIG. 16 is an example of another aspect of an integrated safety device and its mounting apparatus disclosed herein.

The next variation as shown in FIG. 16 comprises a locking insert 1602 attached to the Safety Device 112, a lockable groove 1604 that accepts this locking insert 1602. The helmet is this insert is inserted and locked by either rotating the helmet into the locking position or an internal locking mechanism triggered by the SIPV system 200 sets a mechanical stop in the lockable groove to retain the safety device 114. The SDD 122 is mounted to the handlebars of the SIPV 100 and is in communication with the SIPV system via wireless formats. Power is either supplied by a separate battery source or may be hardwired to the SIPV 100 power source.

Figure 17:
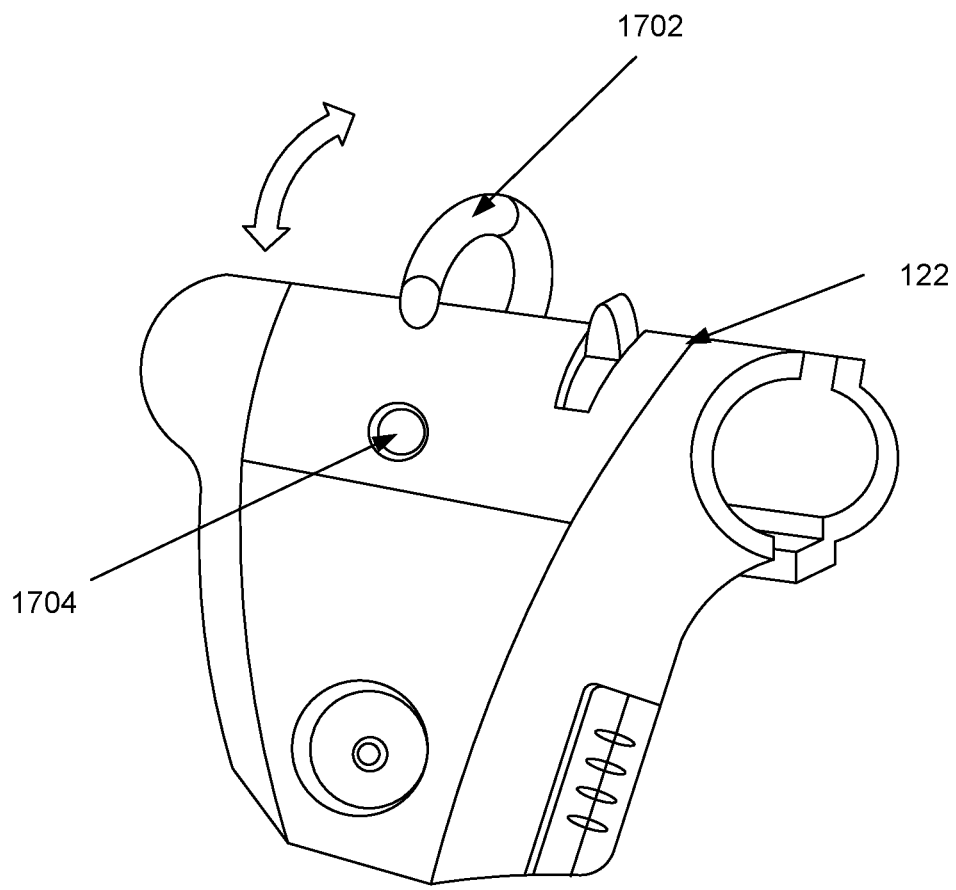
FIG. 17 is an example of another aspect of an integrated safety device and its mounting apparatus disclosed herein.
Figure 18:
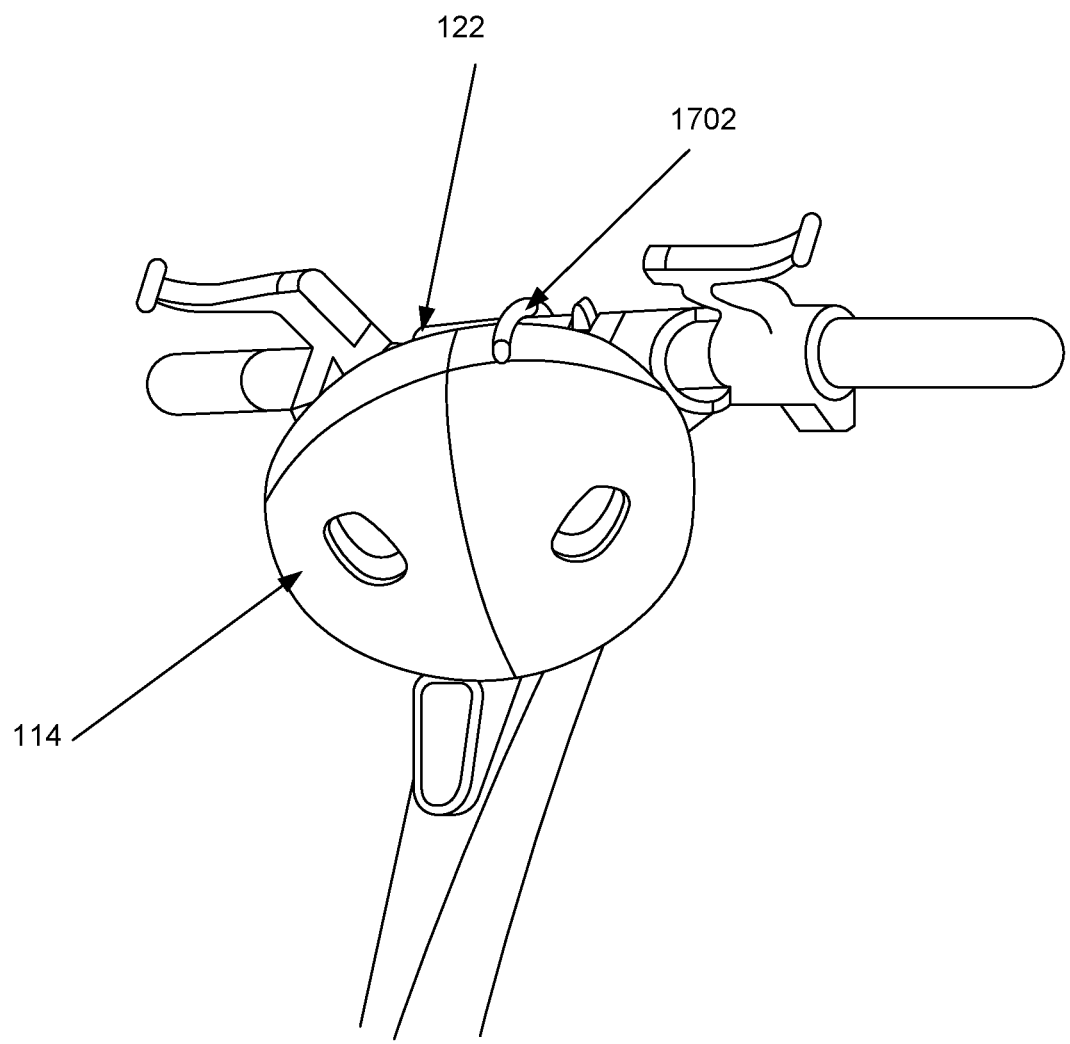
FIG. 18 is an example of another aspect of an integrated safety device and its mounting apparatus disclosed herein.

The variation shown in FIG. 17 comprises an SSD 122 that encloses the handlebar portion of the SIPV 100. The SSD 122 mounts around the front and back of the handlebar conforming to the handlebar profile of the SIPV 100. A Safety device hook 1702 is deployed at the top of the SSD 122 and is released by a command from the SIPV system 200. The Safety Device hook 1702 interfaces with a hole 1704 in the Safety Device 114 perimeter as shown in FIG. 18.

Figure 19:
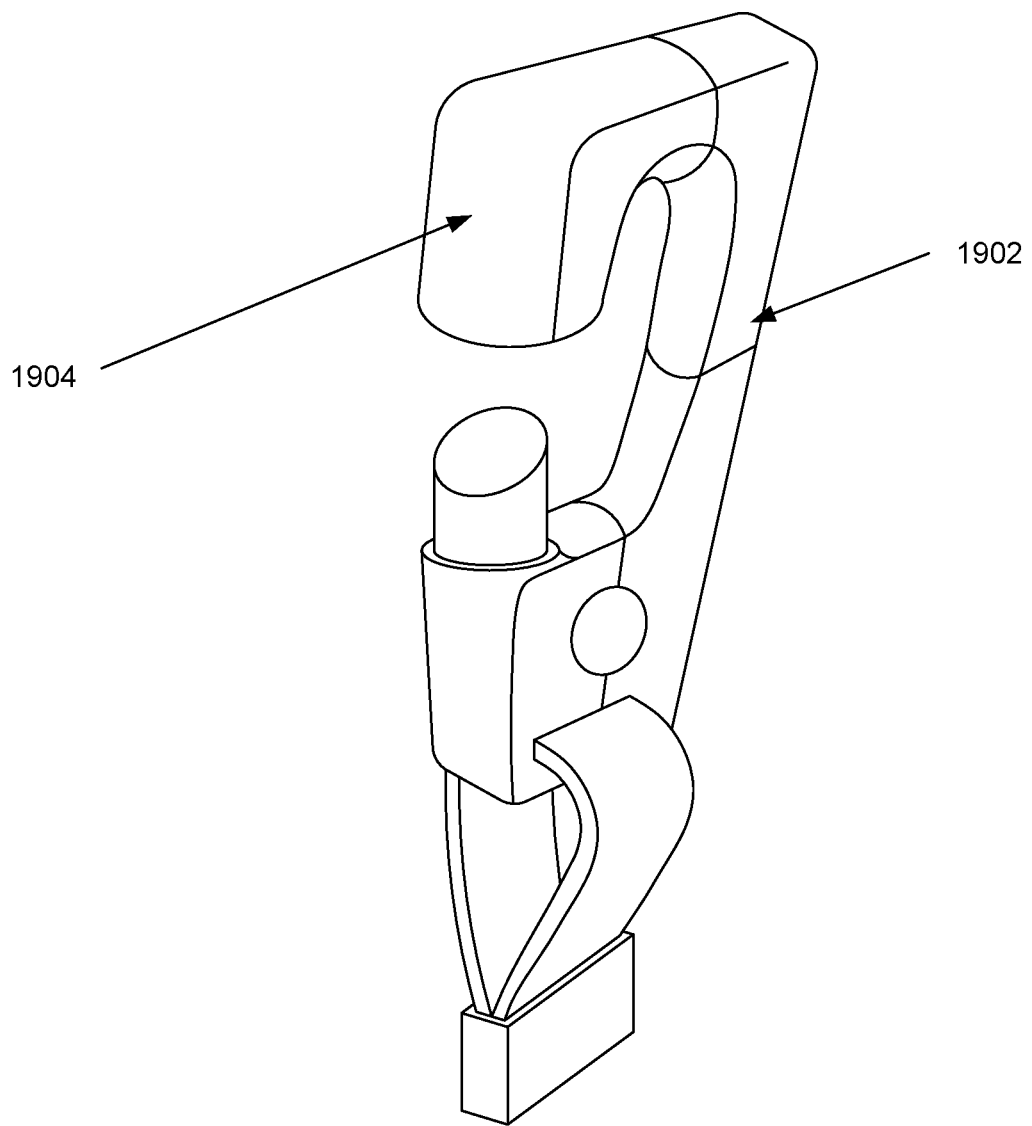
FIG. 19 is an example of another aspect of an integrated safety device and its mounting apparatus disclosed herein.

The variation shown in FIG. 19 only mounts a lock loop 1902 comprising an NFC chip and mounted on the handlebars of the SIPV 100. The web enabled aspect of this variation of SSD 122 is a locking clip 1904 attached to the Safety Device 114. This locking clip 1904 senses that the lock loop 1902 is engaged with the clip and locks and is powered by a small battery and comprises an NFC device that allows a mobile device held by a user to unlock the Safety device 114 upon receipt of an authorization code from the SIPV system 200. The Safety Device 114 when returned activates the NFC chip in the lock loop 1902 and only authorizes a locked clip upon detection of the Safety Device 114.

Figure 20:
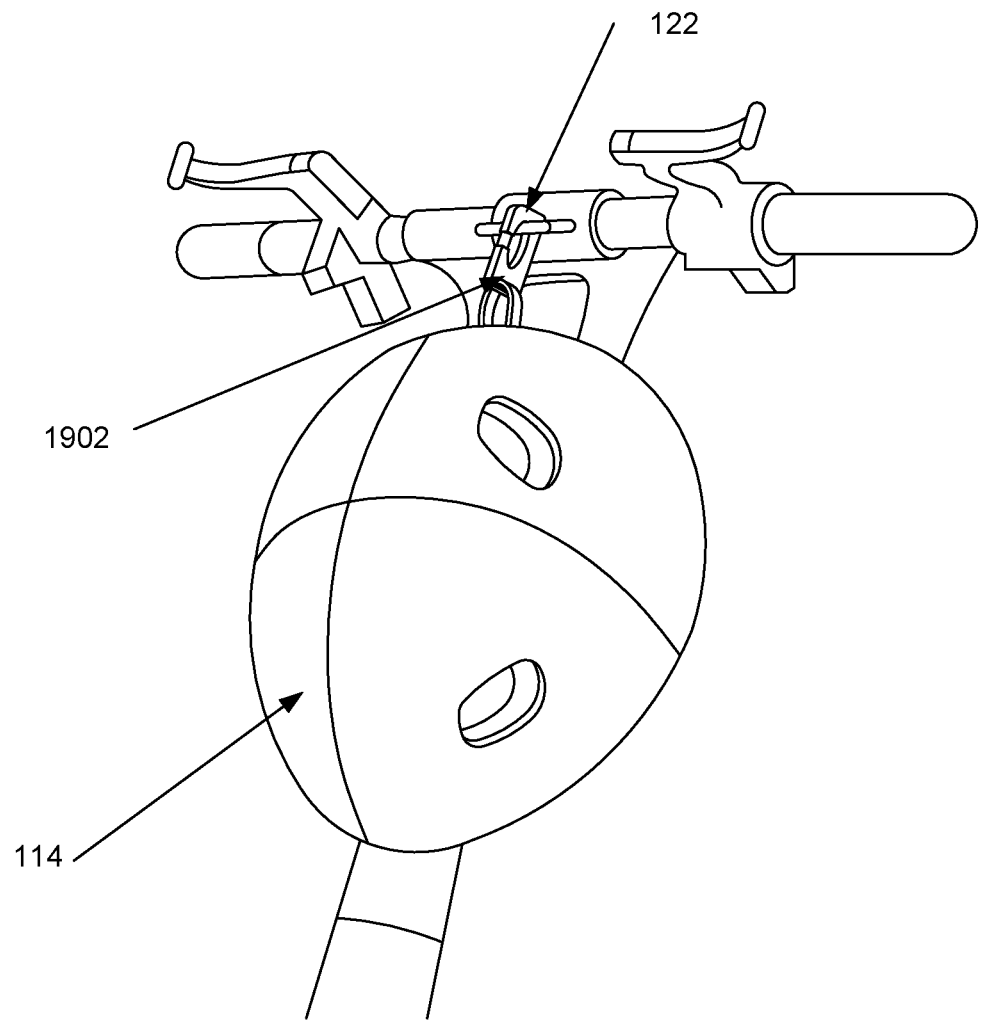
FIG. 20 is an illustration of the method steps of mounting of another aspect of an integrated safety device disclosed herein.

FIG. 20 shows the Safety Device 114 mounted to the locking loop 1902.

Figure 21:
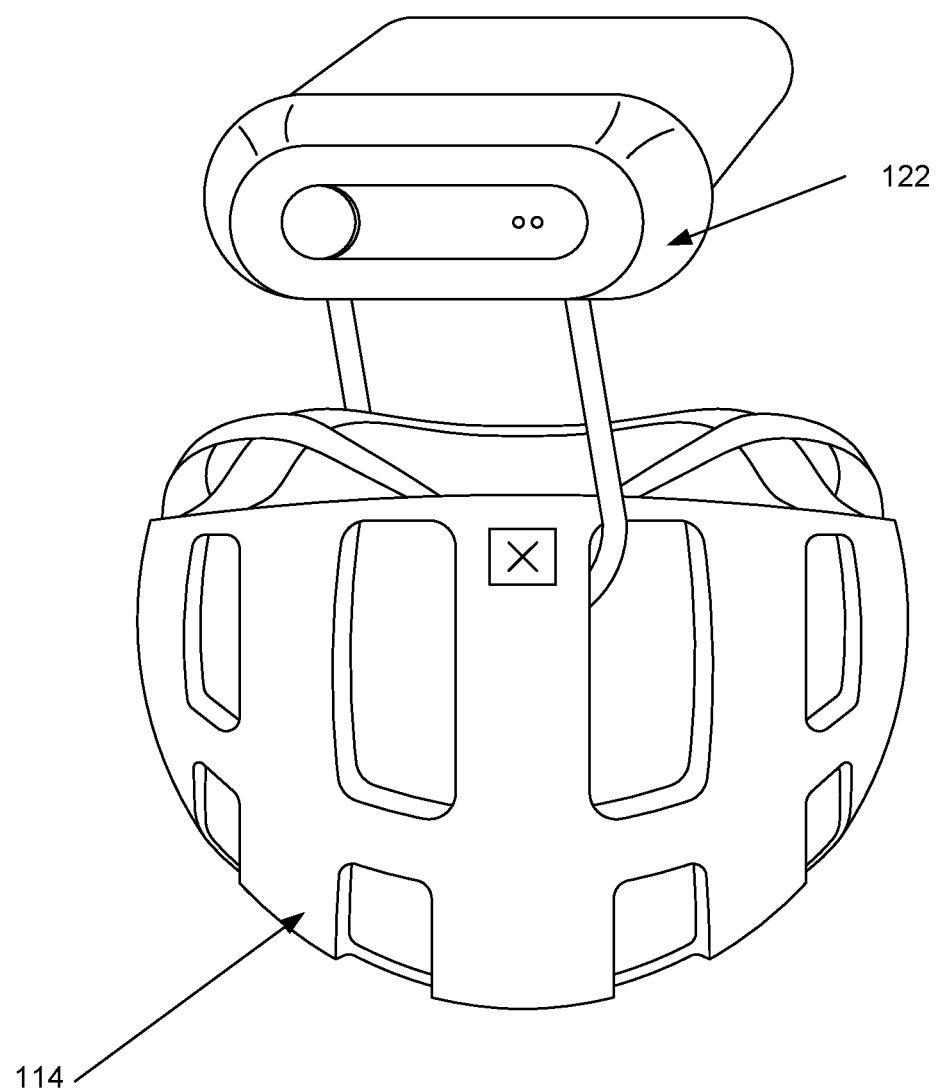
FIG. 21 is an example of another aspect of an integrated safety device and its mounting apparatus disclosed herein.

FIG. 21 shows another variation of the SSD 122 that has a locking loop that passes through the helmet openings and relocks with a rotating détente.

Figure 22:
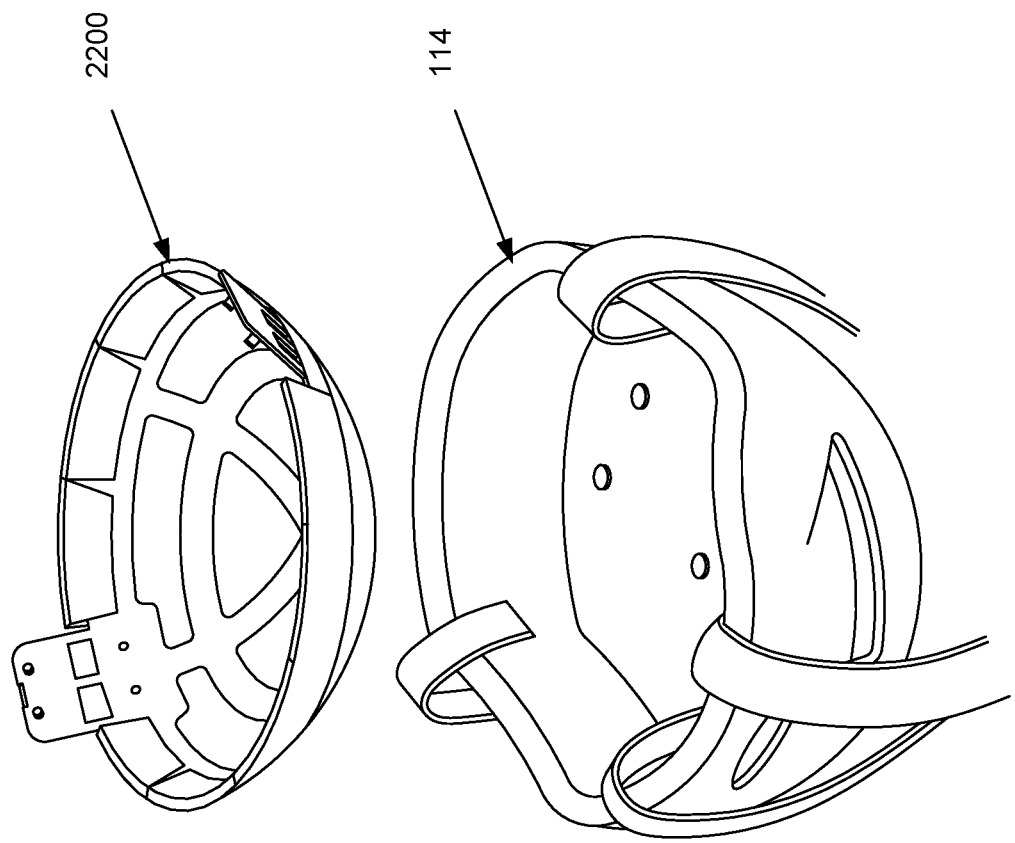
FIG. 22 is an illustration of a method of inserting a helmet liner mount disclosed herein.
Figure 22:
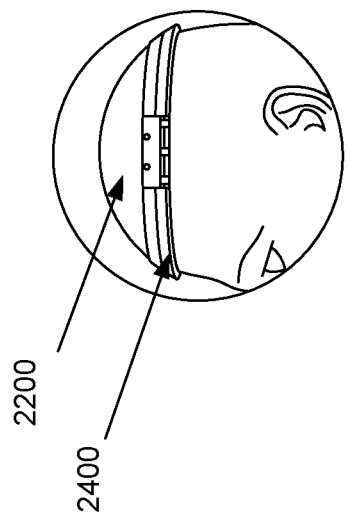
Figure 24:
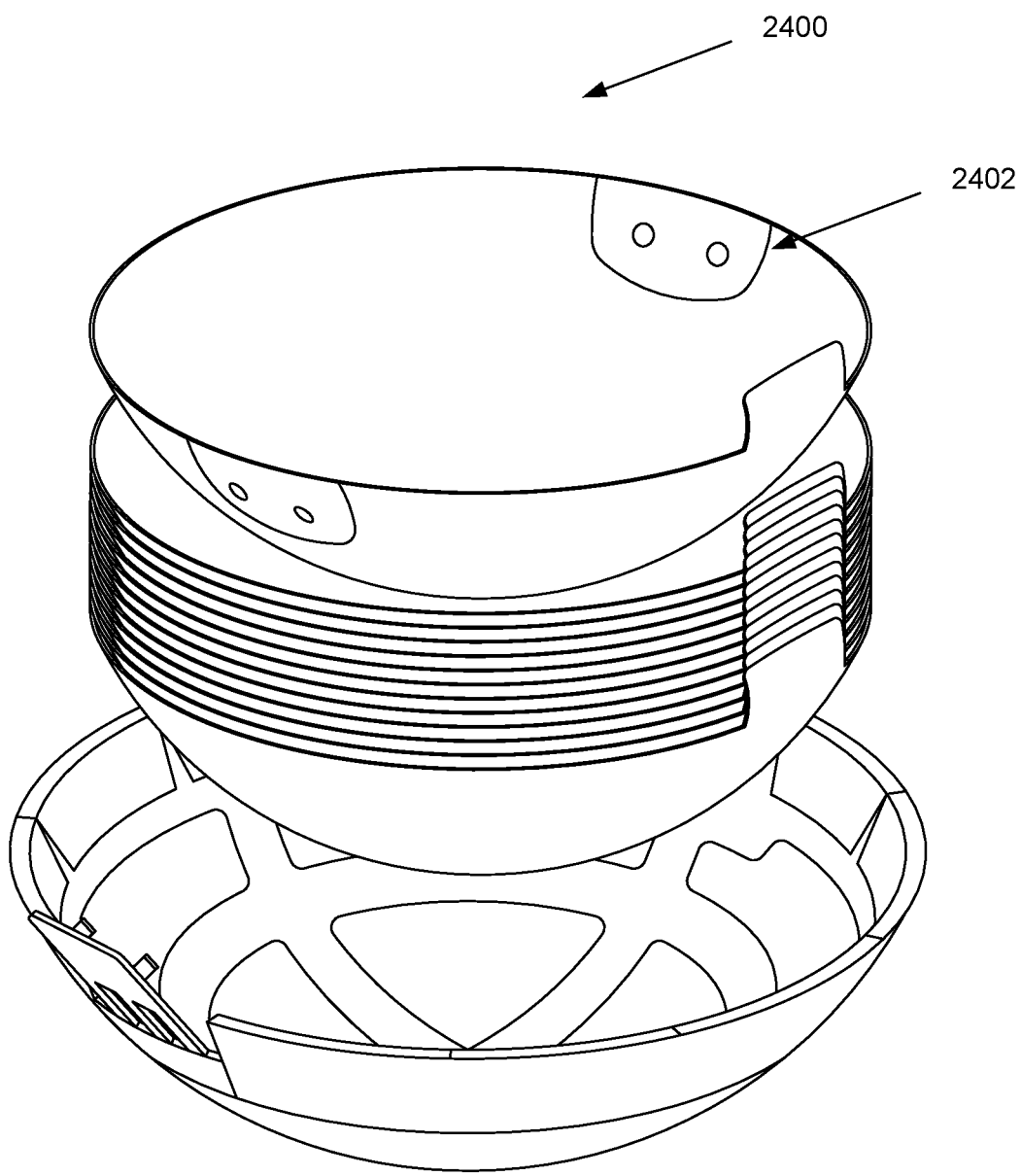
FIG. 24 is an illustration of the assembly apparatus of the helmet liner and a helmet liner magazine disclosed herein.

Disposable Safety Device Liner:

One of the aspects of this system is that it uses a disposable Safety Device liner concept as shown in FIG. 22. This provides a remediation solution to the used helmet issue present in most ride share systems by emplacing a Safety Device liner tray 2200 between the Safety Device 114 and the users head. The Safety Device Liner Tray 2200 further comprises a stack of disposable Safety Device Liners (SDL) 2402 in a magazine 2400 of at least 5 SDL 2402 (as shown in FIG. 24) that would provide a hygienic barrier between the user and the Safety Device 114. This system of disposable SDL 2402 comprises either retrofitted Safety Devices 114 or built for purpose Safety Devices 114. A built for purpose Safety Device 114 is shown in FIG. 22. The SDL 2402 itself comprises a combination of materials selected from a group further comprising; moisture proof materials, anti-bacterial materials, moisture indicating materials, moisture absorbent materials, scents, colorants, anti-tamper materials, and surface textured materials. In this manner, the SDL 2402 can be created in several formats to create SDL 2402 builds for purpose of the marketplace by layering visually pleasing materials with various layers that help control the type of sanitary or aesthetic effect that would be most useful to the intended user of a Safety Device 114. Several multilayer examples will help indicate some of the diverse uses. In the case of a more tropical environment, an SDL 2402 comprises an absorbent layer, and anti-bacterial layer, a pleasing scent and a moisture barrier to prevent the next layer to be contaminated if a user is sweating profusely. Additionally, a colorant that reacts to perspiration is added to absorbent layer to indicate use by a previous user if that user neglects to remove the liner at the end of the ride or if there has been contamination of another layer beyond the one used. In a colder environment, an SDL 2402 may include a wind or cold insulation layer that helps the user retain their body heat and reflect the heat energy back at the users skin. In an even, colder environment, a layer may comprise a composition of cellulose, iron, water, activated carbon, vermiculite (water reservoir) and salt to produce heat for the user from the exothermic oxidation of iron when the layer is exposed to air. Additionally, a layer of conformable material may be used to enhance the fit or grip of the overall Safety Device 114 comprising a moveable gel or foam layer may be incorporated. These examples do not preclude simple SDLs 2402 of moisture barriers that merely block moisture transfer from one SDL 2402 to the next SDL 2402 in the stack, merely describing the functionality and diversity of various layered designs.

Figure 23:
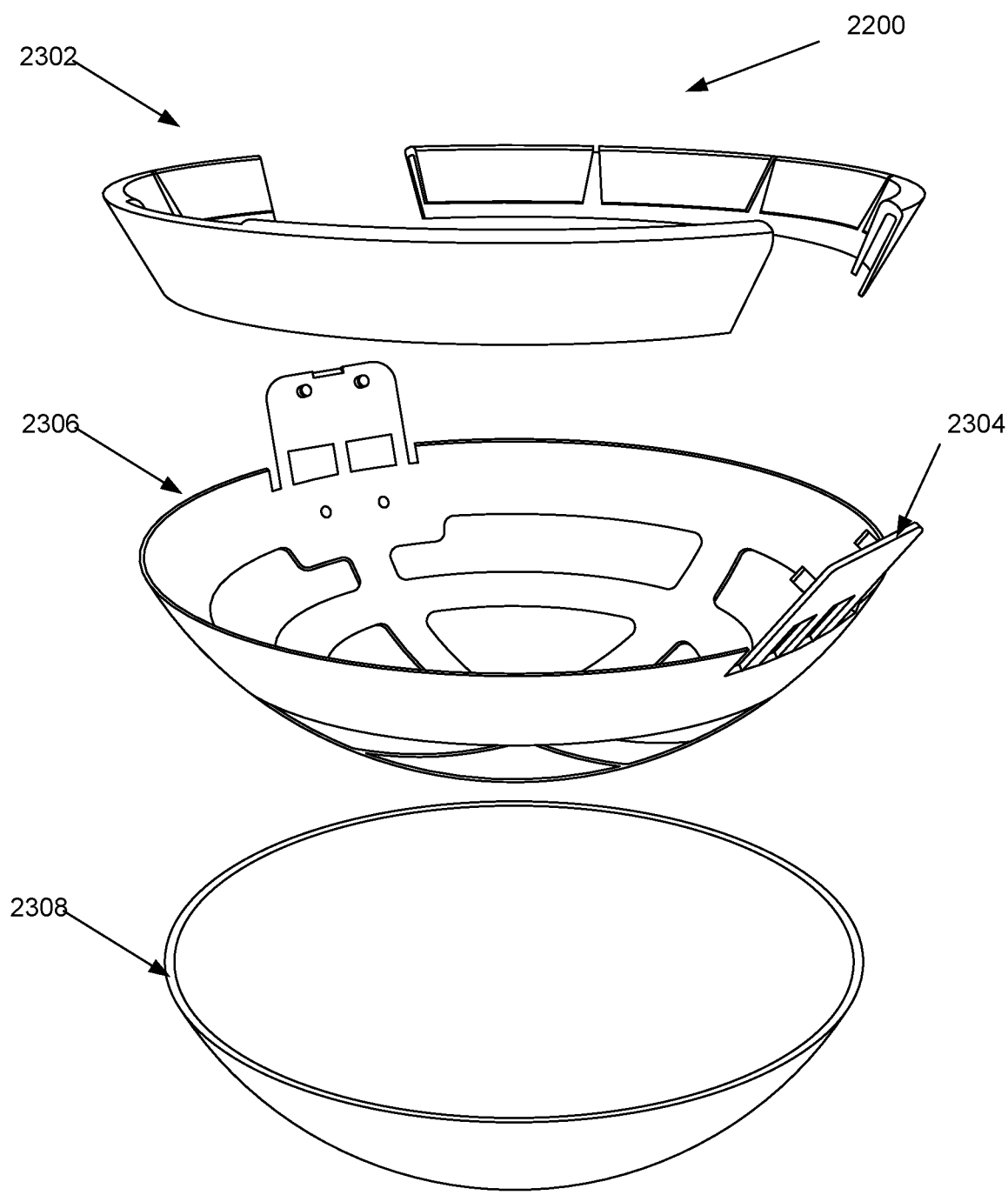
FIG. 23 is an illustration of the assembly apparatus of the helmet liner parts disclosed herein.
Figure 25:
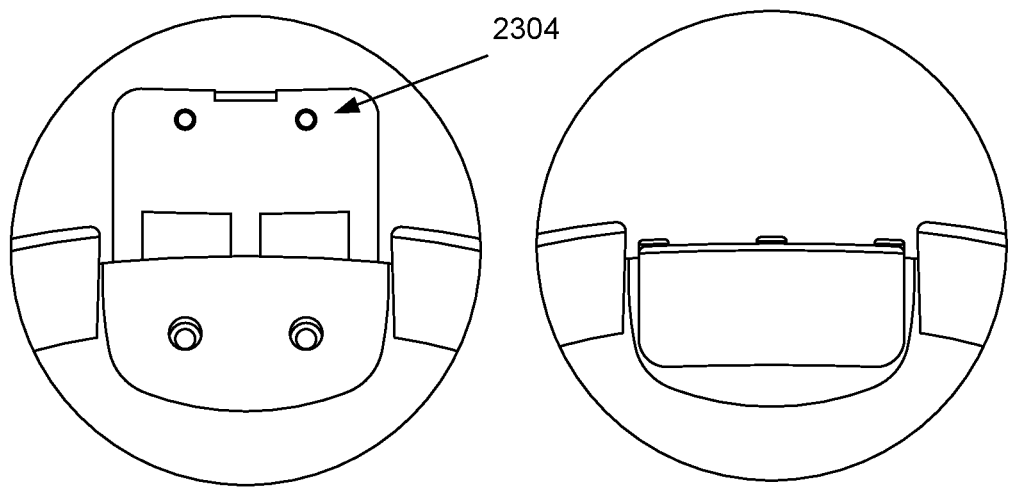
FIG. 25 is an illustration of the latching apparatus of the helmet liner disclosed herein.

In FIG. 23, the SDL tray 2200 comprises banding 2302, a side lock tab 2304 for retaining the disposable SDL magazine 2400, a frame 2306 for retention of the disposable SDL magazine 2400 shown in FIG. 24 and an exterior cover 2308 that inserts into the Safety Device 114 as shown in FIG. 23. This disposable SDL magazine 2400 is constructed in a manner to allow the quick and easy removal and reloading of the SDL magazine 2400 as well as the ability to deploy from 5-20 SDLs 2402 from a single magazine 2400. The magazine 2400 comprises a minimal configuration sufficient to hold several SDL 2402 in place for deployment, but allows a severable removal of the SDL 2402 as each SDL 2402 is deployed for use. This second attribute is accomplished by perforating a line about a detachment point in each SDL 2402. This perforated line can be torn by a user at the end of a ride and removed entirely to leave a clean SDL 2402 behind. Other configurations of the magazines 2400 comprise a reloadable configuration that allows a new set of SDLs 2402 to be inserted without removing the magazine 2400. Still further another configuration of the magazine 2400 would comprise sensors to broadcast the number of liners remaining to the SEPV system 200. Still another configuration of the magazine 2400 would comprise a shock cell or an accelerometer to detect if the user has crashed or fallen. In this configuration, the magazine 2400 is used to house sensors rather than the Safety Device 114 as previously disclosed. This allows a quick retrofit of existing standard safety equipment. FIG. 25 simply displays the open and closed configuration of the side lock tab 2304 when a full magazine 2400 has been inserted in the helmet and is ready to be lock in place.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:
1. An apparatus comprising:
a mount that deploys a safety device wherein the safety device is a helmet; the mount apparatus deploys the helmet upon a command received from a computing device, the computing device and a shared electrically powered vehicle system are wirelessly linked with a shared electrically powered vehicle and wherein the shared electrically powered vehicle system, the computing device, the mount, and the helmet are all wirelessly linked to the shared electrically powered vehicle wherein the shared electrically powered vehicle system, the computing device and the helmet must all be active to permit the shared electrically powered vehicle to be operated.

* * * * *